US012734650B2

(12) United States Patent
Roberts et al.

(10) Patent No.: US 12,734,650 B2
(45) Date of Patent: Sep. 15, 2026

(54) IMPACTING RATCHET TOOL WITH MULTIPLE OPERATING MODES

(71) Applicant: MILWAUKEE ELECTRIC TOOL CORPORATION, Brookfield, WI (US)

(72) Inventors: Braden A. Roberts, Brookfield, WI (US); Jacob P. Schneider, Cedarburg, WI (US); Ethan McKenzie, Brookfield, WI (US); Kyle Alvares, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/935,131

(22) Filed: Nov. 1, 2024

(65) Prior Publication Data

US 2025/0135611 A1 May 1, 2025

Related U.S. Application Data

(60) Provisional application No. 63/653,097, filed on May 29, 2024, provisional application No. 63/595,110, filed on Nov. 1, 2023.

(51) Int. Cl.
*B25B 21/02* (2006.01)
*B25B 21/00* (2006.01)

(52) U.S. Cl.
CPC ............ *B25B 21/02* (2013.01); *B25B 21/004* (2013.01)

(58) Field of Classification Search
CPC .. B25D 16/006; B25D 16/003; B25D 17/043; B25D 2216/0023; B25D 2216/0069; B25D 2216/0084; B25D 2250/165; B25D 2250/221; B25B 21/02; B25B 21/004
See application file for complete search history.

(56) References Cited

U.S. PATENT DOCUMENTS

| | | | |
|---|---|---|---|
| 2,581,033 | A | 1/1952 | Larson et al. |
| 3,270,593 | A | 9/1966 | Kaman |
| 3,848,680 | A | 11/1974 | Legler |

(Continued)

FOREIGN PATENT DOCUMENTS

| | | | |
|---|---|---|---|
| CN | 201669690 | U | 12/2010 |
| CN | 201970289 | U | 9/2011 |

(Continued)

*Primary Examiner* — Michelle Lopez
(74) *Attorney, Agent, or Firm* — Michael Best & Friedrich LLP

(57) ABSTRACT

An impact tool including a housing, a motor having an output shaft rotatable about a first axis, and an impact mechanism. The impact mechanism includes a camshaft, an anvil, and a hammer configured to reciprocate along the camshaft to impart rotational impacts to the anvil in a first operating mode and to directly drive the anvil in a second operating mode. The impact tool further includes a crankshaft coupled to the anvil for co-rotation with the anvil, a yoke driven by the crankshaft to reciprocate about a second axis perpendicular to the first axis, an output drive, and a pawl configured to selectively couple the output drive to the yoke for co-rotation with the yoke in a first rotational locking direction about the second axis and to permit the yoke to rotate relative to the pawl in a second rotational locking direction about the second axis.

20 Claims, 18 Drawing Sheets

(56) References Cited

U.S. PATENT DOCUMENTS 4,279,171 A 7/1981 Fylling
4,321,973 A 3/1982 Maurer
4,346,630 A * 8/1982 Hanson ................. B25B 21/004 81/57.39
4,505,170 A 3/1985 Van Laere
4,619,162 A 10/1986 Van Laere
4,751,970 A 6/1988 Hecker et al.
4,822,958 A 4/1989 Van Laere
4,905,423 A 3/1990 Van Laere
4,977,966 A 12/1990 Farber et al.
5,025,869 A 6/1991 Terunuma et al.
5,111,890 A 5/1992 Ranger et al.
6,196,330 B1 3/2001 Matthias et al.
6,491,111 B1 12/2002 Livingston et al.
7,080,578 B2 7/2006 Izumisawa
7,156,187 B1 1/2007 Townsan
7,331,404 B2 2/2008 Pusateri
7,793,560 B2 9/2010 Bodine et al.
7,886,840 B2 2/2011 Young et al.
8,051,746 B2 11/2011 Bouchard et al.
D657,646 S 4/2012 Schoch et al.
8,286,723 B2 10/2012 Puzio et al.
8,347,750 B2 1/2013 Bodine et al.
8,347,979 B2 1/2013 Young et al.
8,403,072 B2 3/2013 Eshleman et al.
8,418,778 B2 4/2013 Eshleman et al.
8,490,714 B2 7/2013 Nakamura
8,555,999 B2 10/2013 McRoberts et al.
8,631,880 B2 1/2014 Murthy et al.
D703,017 S 4/2014 Concari
8,695,725 B2 4/2014 Lau et al.
8,760,102 B2 6/2014 Hirabayashi
8,783,378 B2 7/2014 Zhou
8,800,679 B2 8/2014 Eshleman et al.
8,800,680 B2 8/2014 Eshleman et al.
8,925,646 B2 1/2015 Seith et al.
8,961,358 B2 2/2015 Hirabayashi
8,984,977 B2 3/2015 Bodine et al.
9,016,395 B2 4/2015 Scott
9,022,888 B2 5/2015 McClung
9,038,745 B2 5/2015 Mattson et al.
9,085,077 B2 7/2015 Lau et al.
9,138,842 B2 9/2015 Su et al.
9,193,056 B2 11/2015 Lin
9,199,362 B2 12/2015 Eshleman et al.
9,205,547 B2 12/2015 Hirabayashi et al.
9,211,636 B2 12/2015 Eshleman et al.
9,266,178 B2 2/2016 Eshleman et al.
9,266,226 B2 * 2/2016 Timmons .............. B25B 21/004
9,266,230 B2 2/2016 Maddilate et al.
9,321,155 B2 4/2016 Eshleman et al.
9,321,156 B2 4/2016 Eshleman et al.
9,475,180 B2 10/2016 Eshleman et al.
9,539,683 B2 1/2017 Watford et al.
9,550,283 B2 1/2017 Johnson
9,550,284 B2 1/2017 Seith et al.
9,555,532 B2 1/2017 Amend et al.
9,592,591 B2 3/2017 Mcclung
9,592,600 B2 3/2017 Seith et al.
9,604,334 B2 3/2017 Watford et al.
9,662,756 B2 5/2017 Watford et al.
9,707,654 B2 7/2017 Myhill
9,782,883 B2 10/2017 Fuchs et al.
9,808,896 B2 11/2017 Myhill
9,827,641 B2 11/2017 da Palma et al.
9,833,885 B2 12/2017 Seith et al.
9,931,743 B2 4/2018 Lau et al.
9,975,224 B2 5/2018 Tanaka et al.
10,016,881 B2 7/2018 Aoyagi
10,052,749 B2 8/2018 Mattson et al.
10,131,037 B2 11/2018 Seith et al.
10,160,049 B2 12/2018 Eshleman et al.
10,220,493 B2 3/2019 Seith et al.
10,377,022 B2 8/2019 Saitou et al.
10,478,959 B2 11/2019 Brennenstuhl et al.
10,525,578 B2 1/2020 Lau et al.
10,668,602 B2 6/2020 Ishibashi
10,786,888 B2 9/2020 Chung et al.
10,800,014 B2 10/2020 Seith et al.
10,926,383 B2 2/2021 Scott et al.
11,103,981 B2 8/2021 Hargis et al.
11,235,444 B2 2/2022 Muramatsu et al.
11,247,316 B2 2/2022 Hirabayashi et al.
2005/0279519 A1 12/2005 Clark
2006/0011363 A1 1/2006 Chang
2009/0159304 A1 6/2009 Teranishi et al.
2009/0272556 A1 11/2009 Young et al.
2010/0064864 A1 3/2010 Kobayashi
2010/0319474 A1 12/2010 Bodine et al.
2011/0005788 A1 1/2011 Chen
2011/0100663 A1 5/2011 Wu
2011/0139474 A1 6/2011 Seith et al.
2011/0278033 A1 11/2011 Song et al.
2011/0278034 A1 11/2011 Song et al.
2011/0278036 A1 11/2011 Song et al.
2012/0261152 A1 10/2012 Wei
2012/0318548 A1 12/2012 Hirabayashi et al.
2014/0157961 A1 * 6/2014 Chen ....................... B25B 21/02 81/464
2014/0262394 A1 9/2014 Scott et al.
2014/0262396 A1 9/2014 Mcclung
2015/0158155 A1 6/2015 Tsubakimoto
2015/0174744 A1 6/2015 Scott et al.
2015/0273679 A1 10/2015 Su et al.
2015/0364972 A1 12/2015 Ito
2016/0075004 A1 3/2016 Tsubakimoto et al.
2016/0214238 A1 7/2016 Sun
2017/0239801 A1 8/2017 Kondo et al.
2018/0354117 A1 12/2018 Wu et al.
2019/0160644 A1 5/2019 Wu et al.
2019/0240816 A1 8/2019 Su et al.
2021/0046620 A1 2/2021 Teng et al.
2021/0086333 A1 3/2021 Murakami et al.
2021/0122025 A1 4/2021 Cyborski et al.
2021/0138616 A1 5/2021 Scott et al.
2021/0162574 A1 6/2021 Dedrickson

FOREIGN PATENT DOCUMENTS

CN 203566589 U 4/2014
CN 206588907 U 10/2017
CN 108687708 A 10/2018
CN 110549288 A 12/2019
CN 110744501 A 2/2020
CN 112296918 A 2/2021
CN 213616502 U 7/2021
DE 1478877 A1 4/1969
EP 0321594 A1 6/1989
EP 2025473 A2 * 2/2009 ............. B25B 21/00
EP 2025473 B1 * 10/2013 ............. B25B 21/00
EP 2759378 A1 7/2014
WO WO2007036183 A1 4/2007
WO WO2007088821 A1 8/2007
WO WO2018042872 A1 3/2018
WO WO2018061387 A1 4/2018
WO WO2018061388 A1 4/2018
WO WO2018142742 A1 8/2018
WO WO2020135184 A1 7/2020

* cited by examiner

IMPACTING RATCHET TOOL WITH MULTIPLE OPERATING MODES

CROSS-REFERENCE TO RELATED APPLICATIONS

This application claims priority to U.S. Provisional Patent Application No. 63/653,097, filed May 29, 2024, and U.S. Provisional Patent Application No. 63/595,110, filed Nov. 1, 2023, the entire contents of both of which are incorporated herein by reference.

BACKGROUND

The present disclosure relates to power tools, and more particularly to impacting ratchet tools.

SUMMARY

The present disclosure provides, in one aspect, an impact tool including a housing, a motor disposed within the housing, the motor including an output shaft rotatable about a first axis, and an impact mechanism. The impact mechanism includes a camshaft driven by the motor to rotate about the first axis, an anvil, and a hammer configured to reciprocate along the camshaft to impart rotational impacts to the anvil in response to rotation of the camshaft in a first direction about the first axis in a first operating mode of the impact tool and to directly drive the anvil in response to rotation of the camshaft in a second direction about the first axis opposite the first direction in a second operating mode of the impact tool. The impact tool also includes a crankshaft coupled to the anvil for co-rotation with the anvil, a yoke driven by the crankshaft to reciprocate about a second axis perpendicular to the first axis in response to rotation of the crankshaft, an output drive configured to receive a tool element, and a pawl configured to selectively couple the output drive to the yoke for co-rotation with the yoke in a first rotational locking direction about the second axis and to permit the yoke to rotate relative to the pawl in a second rotational locking direction about the second axis opposite the first rotational locking direction.

In another aspect, the disclosure provides an impact mechanism for an impact tool. The impact mechanism includes a camshaft, an anvil, a first hammer, and a second hammer. The camshaft is configured to rotate about an axis in response to receiving a motor output. The anvil includes anvil lugs. The first hammer is mounted to the camshaft and includes hammer lugs that are configured to rotationally impact the anvil lugs. The second hammer is sleeved onto the first hammer. One of the first hammer and the second hammer includes a plurality of key portions and the other of the first hammer and the second hammer includes a plurality of keyways, each of the key portions is configured to slide along a corresponding one of the keyways to allow for relative axial movement between the first hammer and the second hammer.

In another aspect, the disclosure provides an impact mechanism for an impact tool. The impact mechanism includes a camshaft configured to rotate about an axis in response to receiving a motor output. The anvil includes anvil lugs. The first hammer is mounted to the camshaft and includes hammer lugs that are configured to rotationally impact the anvil lugs. The second hammer is sleeved on the first hammer. One of the first hammer and the second hammer includes a protrusion that extends from the one of the first hammer and the second hammer toward the other of the first hammer and the second hammer to rotationally couple the first hammer and the second hammer together.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
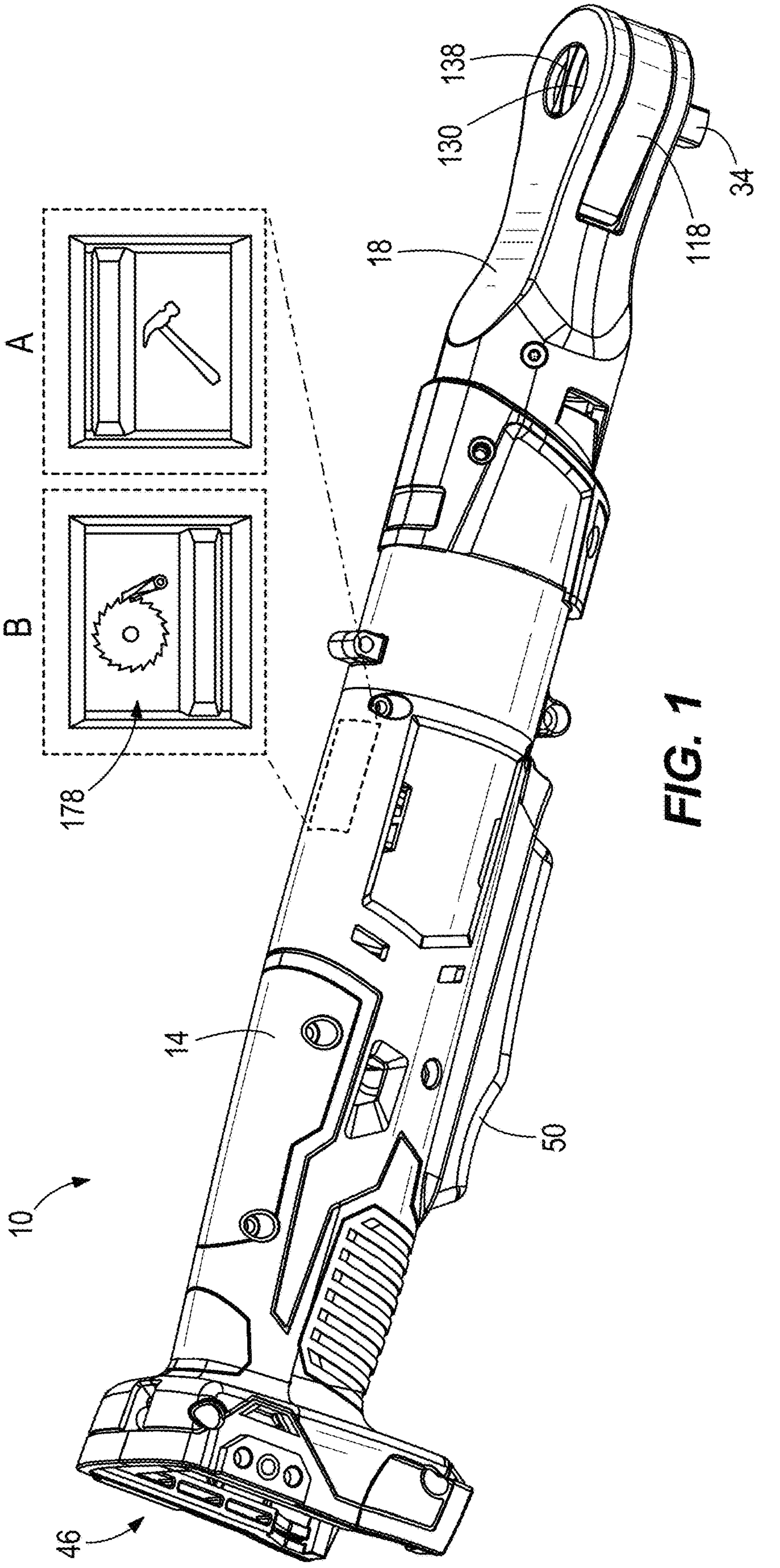
FIG. 1 is a perspective view of an impact tool according to an embodiment of the present disclosure.
Figure 2:
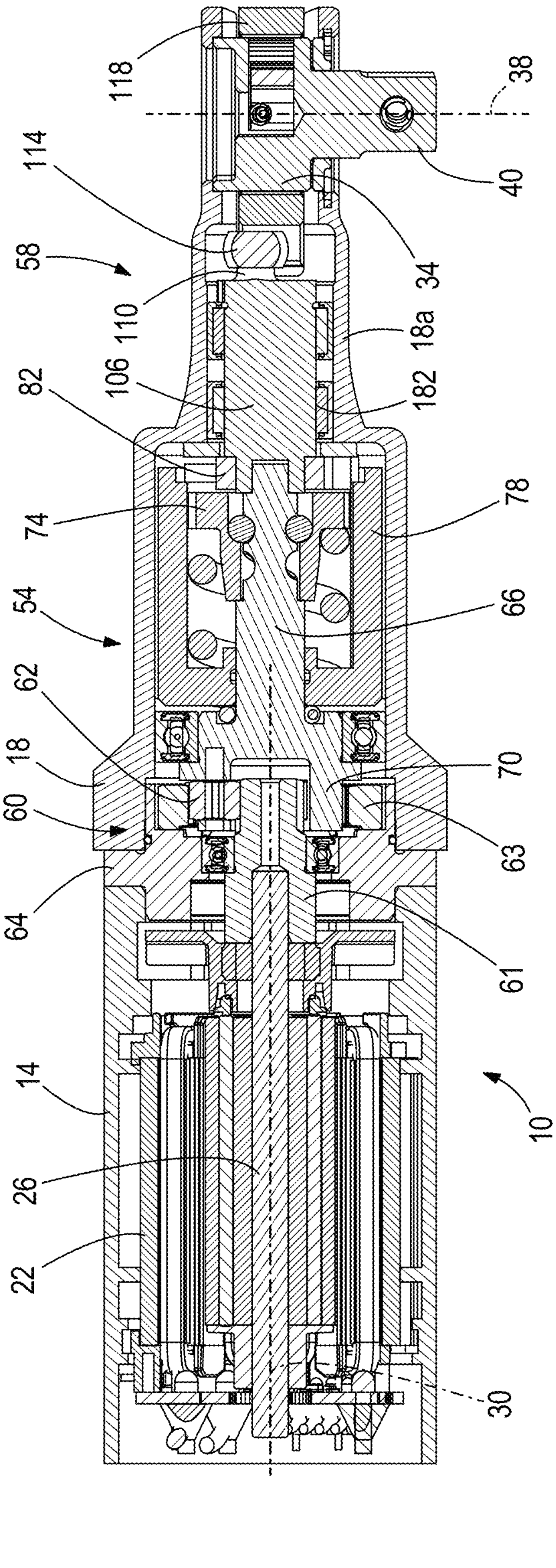
FIG. 2 is a cross-sectional view of the impact tool of FIG. 1.

With reference to FIGS. 1 and 2, an impact tool 10 in accordance with an embodiment of the disclosure includes a housing 14 and a secondary housing or yoke housing 18 coupled to the housing 14. The impact tool 10 further includes a motor 22 (FIG. 2) supported within the housing 14 and is preferably a brushless DC motor. The motor 22 has an output shaft 26 rotatable about a first axis 30 and configured to provide torque to an output drive 34 rotatably supported by the yoke housing 18 for rotation about a second axis 38 oriented perpendicular to the first axis 30. The output drive 34 includes a square drive interface 40, preferably with a nominal size (e.g., ⅜", ½", ¾", 1", etc.). The output drive 34 is configured to be coupled to a tool element (not shown) that performs work on a workpiece (e.g., a fastener, bit, or the like).

In the illustrated embodiment, the impact tool 10 includes a battery pack (not shown) received by a battery receptacle 46. The battery receptacle 46 electrically connects the battery pack to the motor 22 (via suitable electrical and electronic components, such as a PCBA containing MOSFETs, IGBTs, or the like). A trigger switch 50 is located on the housing 14, and actuation of the trigger switch 50 energizes the motor 22. The battery pack may be a 12-volt power tool battery pack that includes three lithium-ion battery cells. Alternatively, the battery pack may include fewer or more battery cells to yield any of a number of different output voltages (e.g., 14.4 volts, 18 volts, etc.). Additionally or alternatively, the battery cells may include chemistries other than lithium-ion such as, for example, nickel cadmium, nickel metal-hydride, or the like. Alternatively, the impact tool 10 may include an electrical cord for powering the motor 22 with a remote electrical source (e.g., a wall outlet), or the impact tool 10 may be pneumatic in yet other embodiments.

Figure 3A:
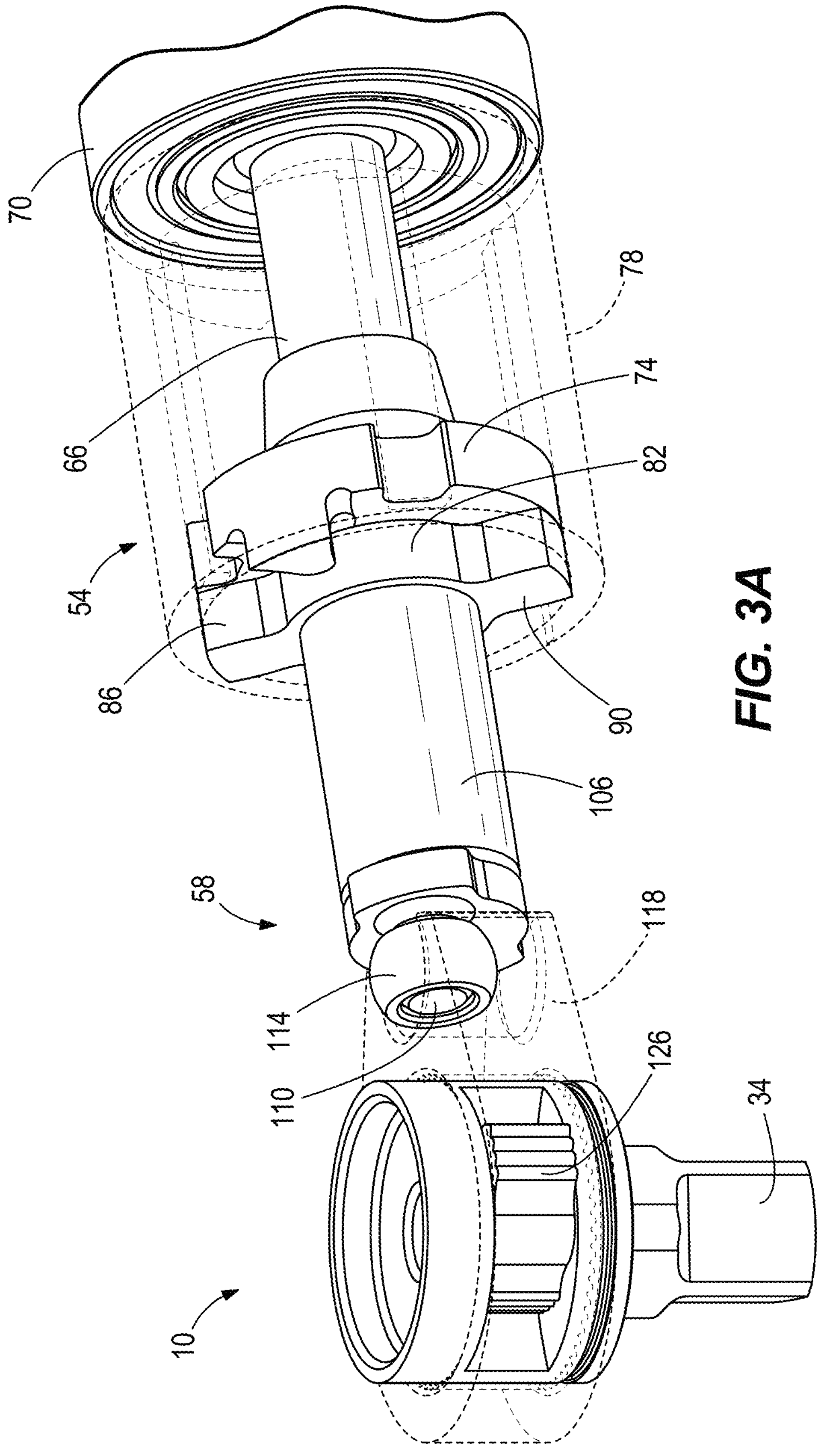
FIG. 3A is a perspective view of an impact mechanism and a ratchet mechanism of the impact tool of FIG. 1.
Figure 3B:
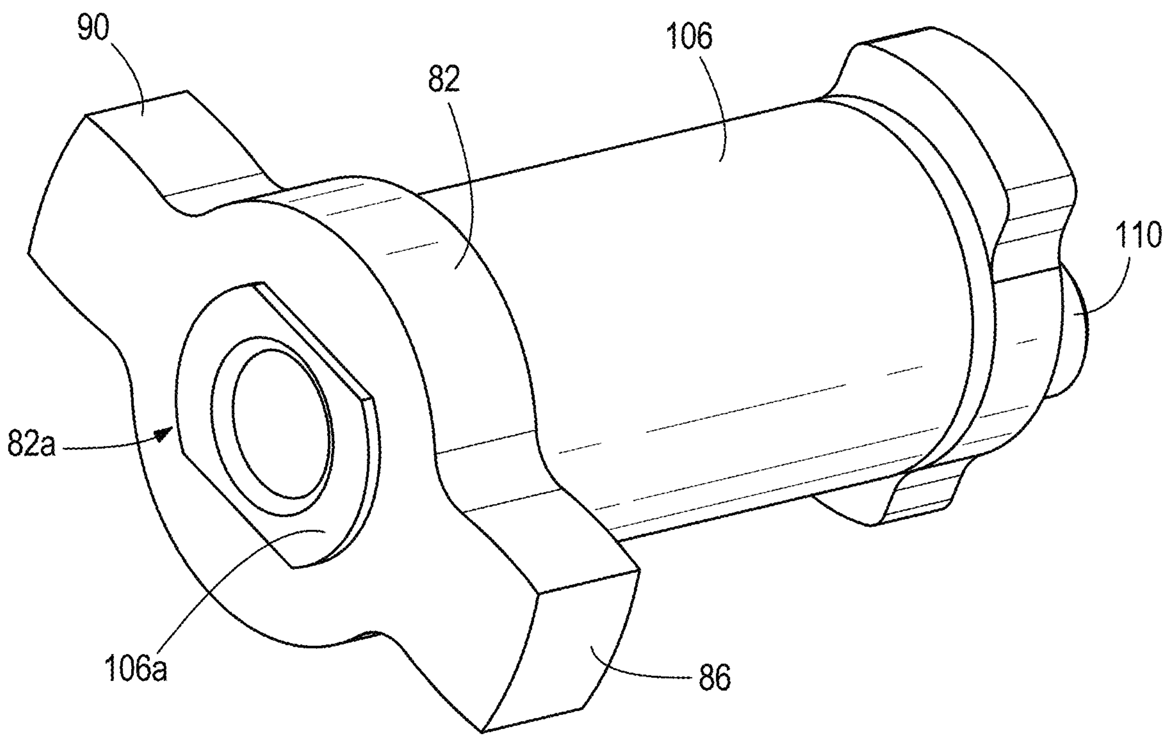
FIG. 3B is a perspective view of an anvil of the impact mechanism and a crankshaft of the ratchet mechanism of FIG. 3A.
Figure 4:
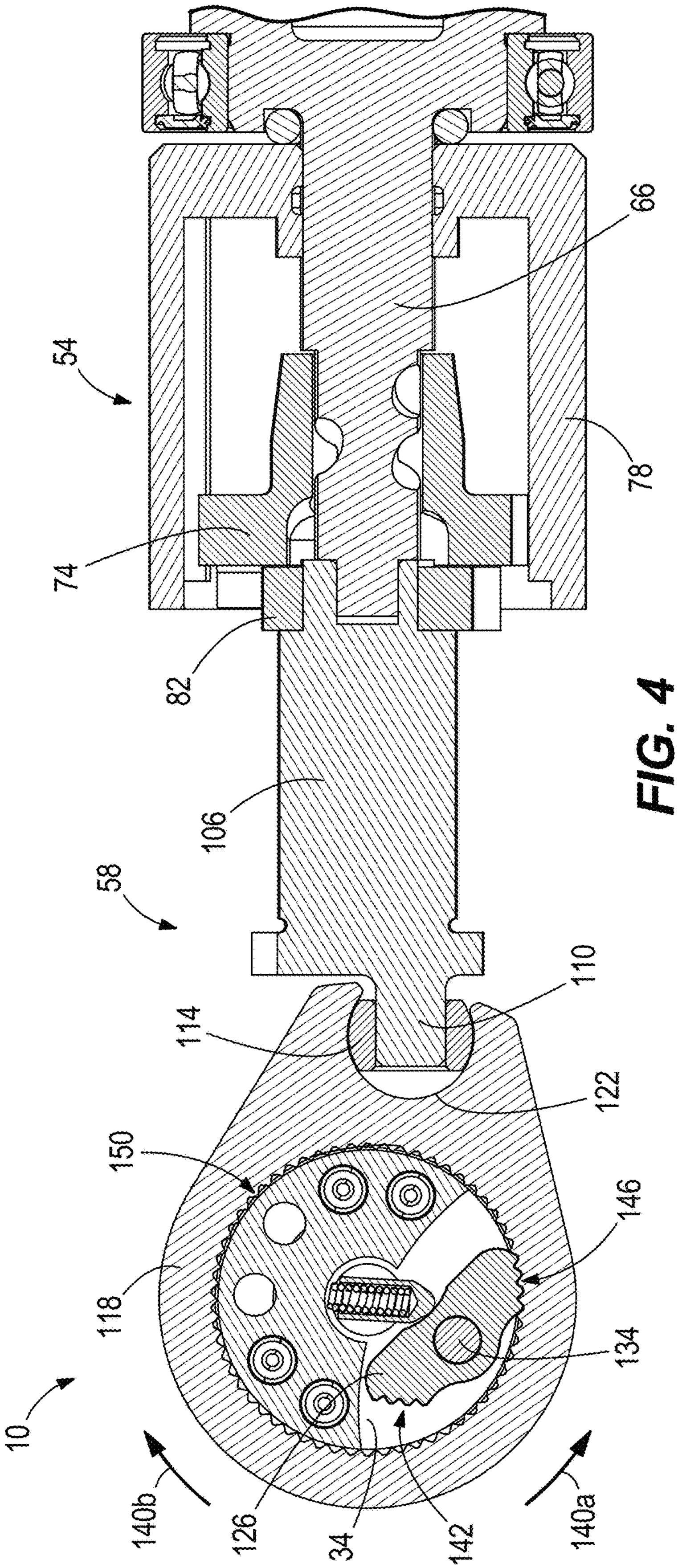
FIG. 4 is a cross-sectional view of the impact mechanism and the ratchet mechanism of FIG. 3A.

With reference to FIGS. 2-4, the illustrated impact tool 10 is an impacting ratchet tool that includes an impact mechanism 54 and a ratchet mechanism 58. The impact mechanism 54 includes a gear assembly in the form of a planetary gearset 60 operably coupled to the motor 22 to provide a speed reduction/torque increase from the motor 22. The planetary gearset 60 includes a pinion 61 coupled for co-rotation with the output shaft 26 of the motor 22, a plurality of planet gears 62 meshed with the pinion 61, and a ring gear 63 meshed with the planet gears 62. The ring gear 63 of the planetary gearset 60 is rotationally fixed within a gear case 64 fixed between the housing 14 and the yoke housing 18.

The impact mechanism 54 further includes a camshaft 66 driven by the output of the planetary gearset 60 (e.g., the camshaft 66 may define a planet carrier 70 of the planetary gearset 60), an inner hammer 74 coupled to the camshaft 66, an outer hammer 78 surrounding the inner hammer 74 and having a rear end rotationally supported by the camshaft 66, and an anvil 82 having opposed, radially outward extending anvil lugs 86, 90 (FIGS. 3A and 3B) that receive impacts from corresponding hammer lugs 94, 98 (FIG. 5) on the inner hammer 74. The illustrated impact mechanism 54 also includes a compression spring 80 (shown in FIG. 6) disposed within the outer hammer 78 and configured to bias the inner hammer 74 toward the anvil 82.

With continued reference to FIGS. 2-4, the ratchet mechanism 58 includes a crankshaft 106 rotatably coupled to the camshaft 66 and the anvil 82 of the impact mechanism 54. The crankshaft 106 has an eccentric member 110 arranged within a drive bushing 114. The ratchet mechanism 58 further includes a yoke 118 through which the output drive 34 extends. The yoke 118 has a recess 122 in which the drive bushing 114 is arranged. As explained in further detail below, when the crankshaft 106 is rotated, the drive bushing 114 pivots the yoke 118 in a reciprocating manner to drive the output drive 34.

The illustrated ratchet mechanism 58 includes a pawl 126 and a forward/reverse switch for the ratchet mechanism 58 in the form of a rotational member 130 (FIG. 1). The pawl 126 is provided within the yoke 118 and pivotably secured by a pin 134 (FIG. 4). The pin 134 is coupled to the rotational member 130, which has a gripping actuator 138 that is accessible through the yoke housing 18. The gripping actuator 138 can be used to rotate the rotational member 130, and thus, the pawl 126, between a first position corresponding to a first rotational locking direction **140*a* of the output drive 34 and a second position corresponding to a second rotational locking direction 140*b* of the output drive 34. The rotational member 130 is concentric with the output drive 34 in the illustrated embodiment; however, the rotational member 130 may be offset from the output drive 34 in other embodiments. In yet other embodiments, other types of forward/reverse switches may be used to move the pawl 126**.

With continued reference to FIG. 4, the illustrated pawl 126 includes an angled first end 142 including teeth and an angled second end 146 including teeth. The first end 142 and the second end 146 of the pawl 126 are configured to engage inner teeth 150 of the yoke 118. When the rotational member 130 is rotated to arrange the pawl 126 in the first position, the first end 142 of the pawl 126 meshes with the inner teeth 150 of the yoke 118. The first position thereby prevents the output drive 34 from rotating relative to the yoke 118 in the first rotational locking direction **140*a*. In other words, the pawl 126 couples the output drive 34 for co-rotation with the yoke 118 in the first rotational locking direction 140*a*. The teeth on the first end 142 of the pawl 126 and/or the teeth 150 on the yoke 118 are angled to allow the teeth to slip past each other in the opposite direction 140*b*, thereby permitting the yoke 118 to "ratchet" and rotate relative to the output drive 34 in the second rotational locking direction 140*b*. When the rotational member 130 is rotated to arrange the pawl 126 in the second position (shown in FIG. 4), the second end 146 of the pawl 126 meshes with the inner teeth 150 of the yoke 118. The pawl 126 in the second position thereby prevents the output drive 34 from rotating relative to the yoke 118 in the second rotational locking direction 140*b*. In other words, the pawl 126 couples the output drive 34 for co-rotation with the yoke 118 in the second rotational locking direction 140*b*. The teeth on the second end 146 of the pawl 126 and/or the teeth 150 on the yoke 118 are angled to allow the teeth to slip past each other in the first rotational locking direction 140*a*, thereby permitting the yoke 118 to "ratchet" and rotate relative to the output drive 34 in the first rotational locking direction 140*a***.

Figure 5:
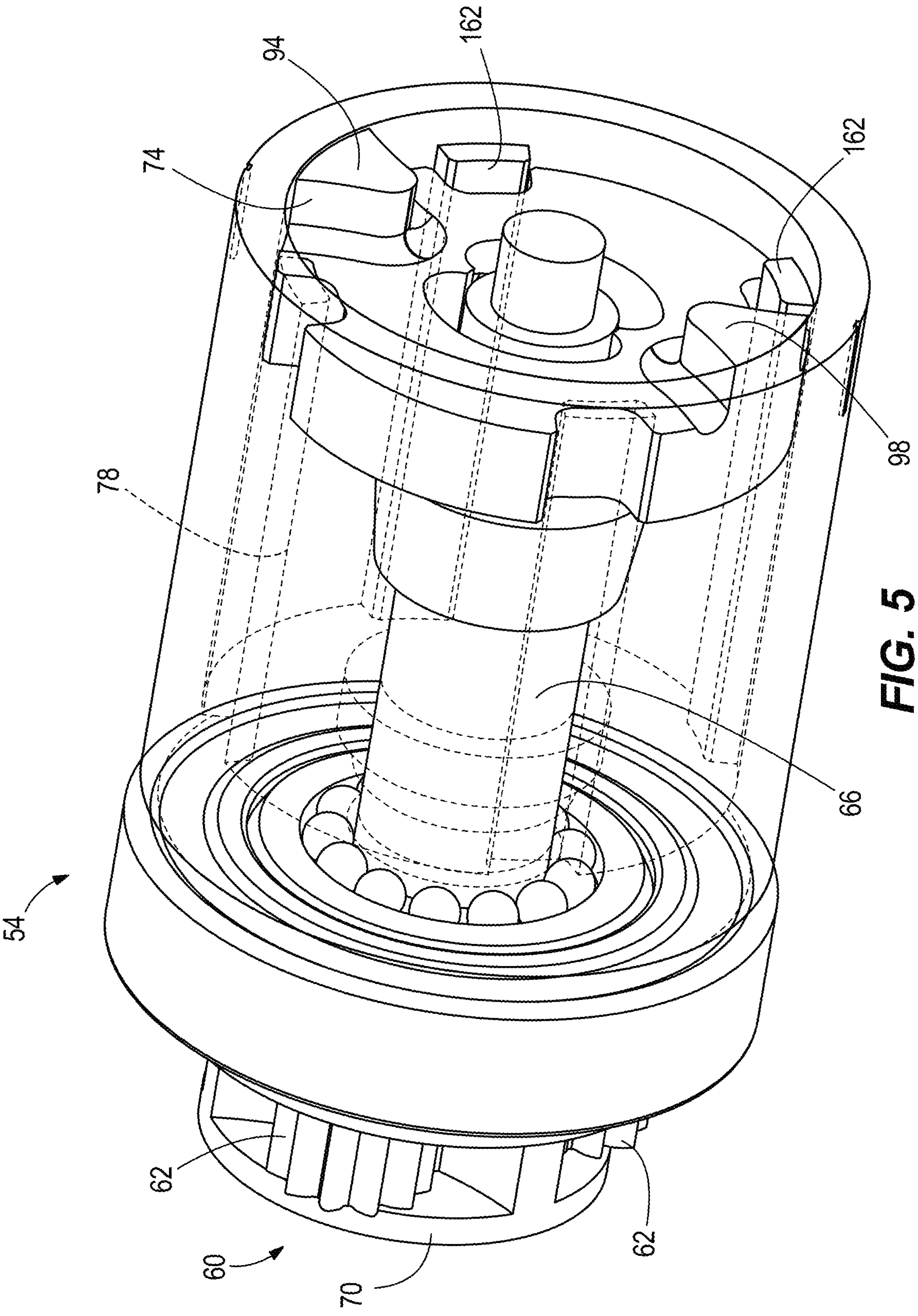
FIG. 5 is a perspective view of the impact mechanism of FIG. 3A with portions removed.
Figure 7:
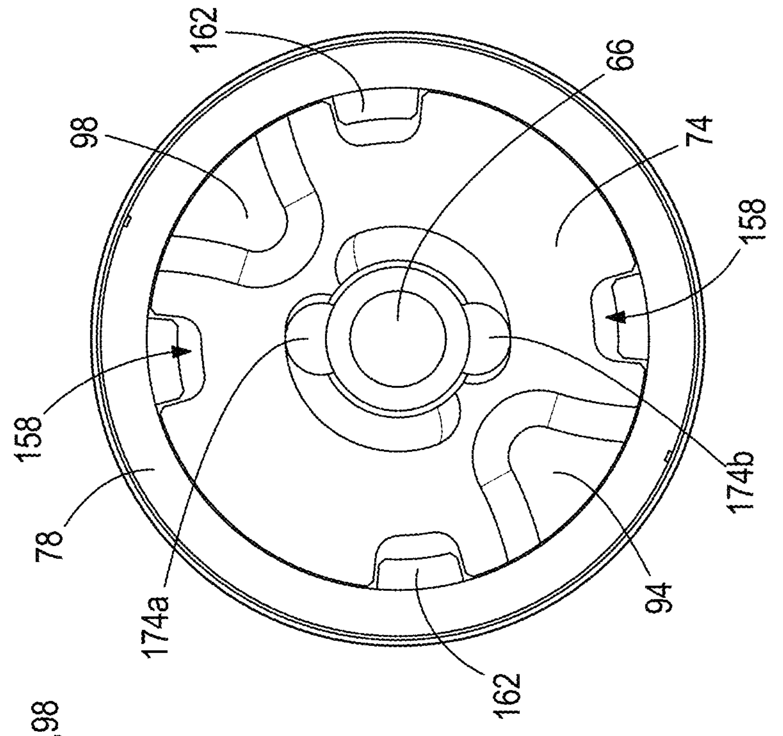
FIG. 7 is a front view of the impact mechanism of FIG. 5.
Figure 6:
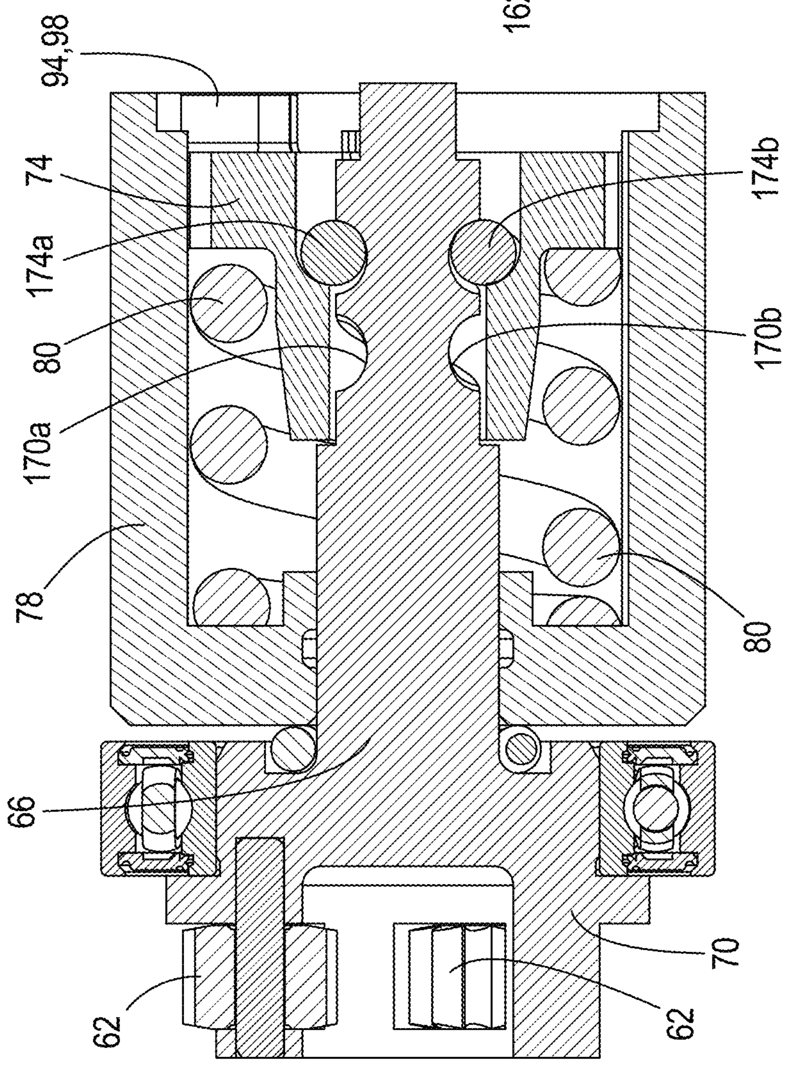
FIG. 6 is a cross-sectional view of the impact mechanism of FIG. 5.

With reference to FIGS. 5-7, a portion of the impact mechanism 54 is illustrated. The outer hammer 78 and inner hammer 74 form a two-piece or double hammer assembly able to provide increased rotating mass and, therefore, increased impact energy to the anvil 82 compared to the inner hammer 74 alone. In addition, the outer diameter of the hammer assembly may be less than a single hammer having an equivalent mass, permitting the impact tool 10 to be more compact.

In the illustrated embodiment, the outer hammer 78 is mounted to a portion of the camshaft 66 such that the outer hammer 78 is radially supported by the camshaft 66. Additionally, the outer hammer 78 is sleeved onto the inner hammer 74 (e.g., by cooperating projections, splines, pins, or any other suitable arrangement) such that the outer hammer 78 is coupled for co-rotation with the inner hammer 74, but the inner hammer 74 is able to move axially relative to the outer hammer 78. In particular, the illustrated inner hammer 74 is provided with keyways 158 configured to receive key portions 162 formed along the outer hammer 78. The inner hammer 74 functions similar to a hammer of a conventional impact mechanism, however the inner hammer 74 is provided with a reduced outer diameter to thereby reduce a size of the impact tool 10. As such, a mass of the inner hammer 74 is also reduced. Rotatably coupling the outer hammer 78 to the inner hammer 74 adds a substantial amount of mass to the inner hammer 74.

Figure 9:
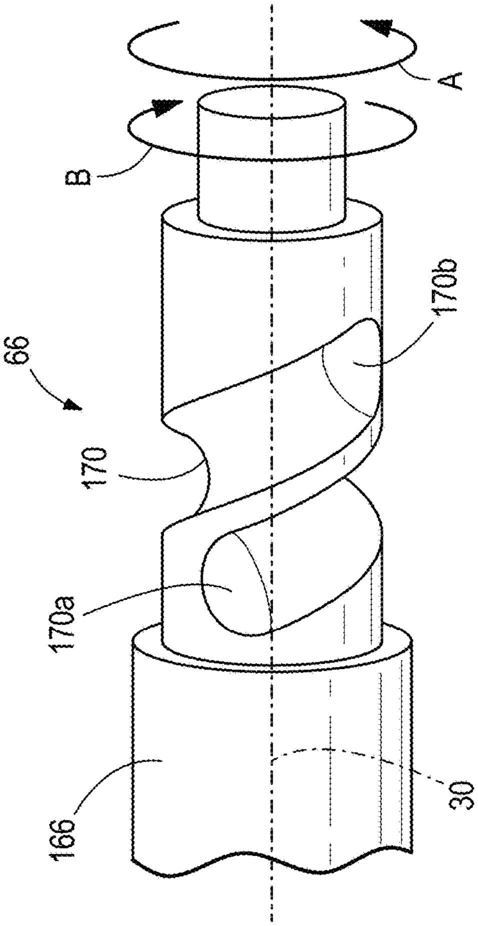
FIG. 9 is a side view of the camshaft of FIG. 8 with portions removed.
Figure 8:
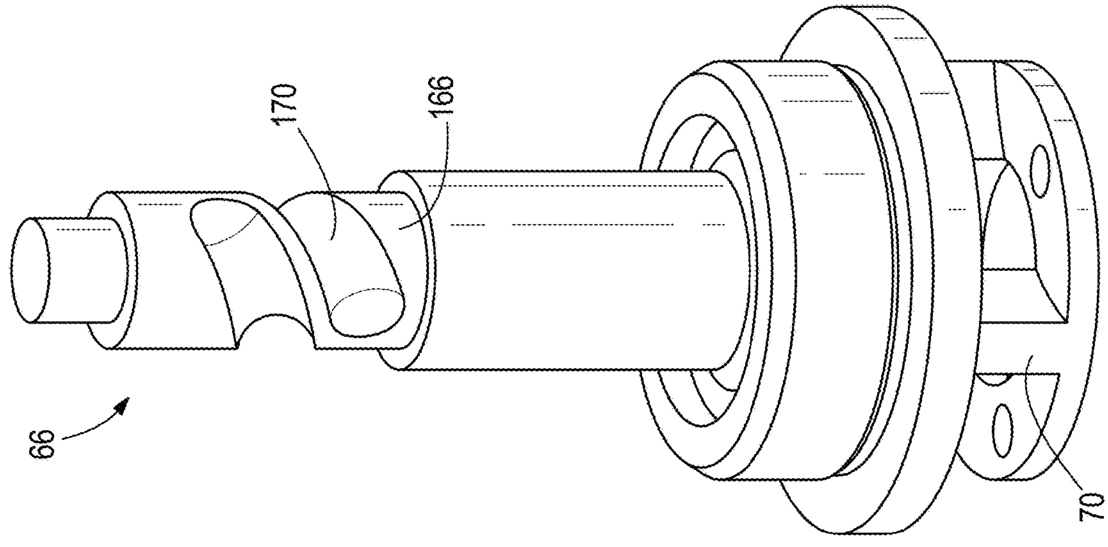
FIG. 8 is a front view of a camshaft of the impact mechanism of FIG. 3A.

With reference to FIGS. 8 and 9, the camshaft 66 of the impact mechanism 54 is illustrated. The camshaft 66 includes a body 166 integrally formed with the planet carrier 70 of the planetary gearset 60. The camshaft 66 further includes a cam groove 170 defined along the body 166. Unlike conventional impact mechanism camshafts, which include a cam groove shaped has a double helix, thereby permitting operation of the impact mechanism in either rotational direction of the camshaft, the illustrated cam groove 170 forms a single helix about the body 166 of the camshaft 66. As described in greater detail below, the geometry of the cam groove 170 causes the impact mechanism 54 to produce rotational impacts in only one rotational direction of the camshaft 66. The impact mechanism 54 is disabled in the opposite rotational direction. Cam balls 174*a*, 174*b* (FIGS. 6-7) are received within the cam groove 170 and couple the inner hammer 74 to the camshaft 66.

With reference back to FIGS. 1 and 2, the impact tool 10 may be switched or toggled between a first mode (e.g., a non-impacting mode) and a second mode (e.g., an impacting mode) via a mode actuator 178. The mode actuator 178 is associated with a sensor (e.g., a microswitch, a Hall Effect sensor, or the like; not shown) configured to sense actuation of the mode actuator 178. The mode actuator 178 may be a sliding switch, a push-button, or the like. The sensor communicates with a controller (not shown) of the impact tool 10 to control a rotational direction of the motor 22 based on actuation (or the position) of the mode actuator 178.

For example, to operate the impact tool 10 in the impacting mode, a user may actuate the mode actuator 178 (e.g., to a first position A; FIG. 1). The motor 22 is configured to rotate the output shaft 26, and therefore, the camshaft 66, in a first rotation direction A about the first axis 30 (FIG. 9). As the camshaft 66 rotates in the first rotation direction A, the cam balls 174*a*, 174*b* are able to travel toward a first or rear end 170*a* of the cam groove 170. This permits the inner hammer 74 to translate rearward when the anvil 82 experiences a resistance torque greater than or equal to a trip torque of the impact mechanism 54 and thus remains stationary. The rear end 170*a* of the cam groove 170 accommodates enough rearward travel of the inner hammer 74 for the hammer lugs 94, 98 to clear the anvil lugs 86, 90, at which this point the inner hammer 74 rotates and is propelled forward along the camshaft 66 by the compression spring 80 to deliver a rotational impact to the anvil 82. The outer hammer 78 co-rotates with the inner hammer 74 providing an increased rotating mass, thereby delivering a greater amount of impact energy and torque to the anvil 82 compared to the inner hammer 74 alone. The crankshaft 106 is coupled to the anvil 82 to co-rotate therewith, such that the drive bushing 114 causes the yoke 118 to pivot in reciprocating manner relative to the yoke housing 18. The yoke 118 then transfers torque to the output drive 34 to either tighten or loosen a workpiece.

To operate the impact tool 10 in the non-impacting mode, the user may actuate the mode actuator 178 (e.g., to a second position B; FIG. 1). The motor 22 is configured to rotate the output shaft 26, and therefore, the camshaft 66, in a second rotation direction B about the first axis 30 (FIG. 9). As the camshaft 66 rotates in the second rotation direction B, the cam ball 174*a* engages a second or front end 170*b* of the cam groove 170. With the cam ball 174*a* at the front end 170*b* of the cam groove 170, the inner hammer 74 and the outer hammer 78 co-rotate with the camshaft 66. In addition, the inner hammer 74 is unable to translate rearward, such that the hammer lugs 94, 98 remain engaged with the anvil lugs 86, 90. Accordingly, the anvil 82 co-rotates with the camshaft 66 and the inner and outer hammers 74, 78, such that the impact mechanism 54 is disabled and instead operates as a direct-drive mechanism. The crankshaft 106 co-rotates with the anvil 82, such that the drive bushing 114 causes the yoke 118 to pivot in reciprocating manner relative to the yoke housing 18. The yoke 118 then transfers torque to the output drive 34 to either tighten or loosen a workpiece.

Whether the workpiece is tightened or loosened depends only on the position of the pawl 126, not the operating direction of the motor 22. Thus, the workpiece may be tightened or loosened, as desired, regardless of whether the impact tool 10 is operating in the impacting mode or the non-impacting mode.

Returning reference to FIGS. 2-3B, the assembling process of the anvil 82 and the crankshaft 106 in the illustrated embodiment advantageously allows the crankshaft 106 to have a more compact size relative to conventional crankshafts. Specifically, the anvil 82 and the crankshaft 106 may be assembled in a two-step process, rather than being formed integrally, which permits, or enables, the compact size of the crankshaft 106. In a first step, the crankshaft 106 may be slid through bearings 182 which are supported by a front portion 18*a* of the yoke housing 18. Specifically, the crankshaft 106 may be slid through the bearings 182 at an end of the crankshaft 106 where the anvil 82 would have been integrally formed. In some instances, the bearings 182 may first be slid onto crankshaft 106, and then the crankshaft 106 and the bearings 182 together may be slid through the front portion 18*a* of the yoke housing 18. In a second step, the anvil 82 may be pressed onto the crankshaft 106 after the crankshaft 106 is inserted through the bearings 182. Specifically, the anvil 82 includes a coupling aperture 82*a*, and the crankshaft 106 includes a coupling portion 106*a* that may be inserted through the coupling aperture 82*a* for securing the anvil 82 and the crankshaft 106 relative to one another. The coupling portion 106*a* of the crankshaft 106 is positioned at an end of the crankshaft 106 opposite from the eccentric member 110. The coupling aperture 82*a* and the coupling portion 106*a* are complimentarily shaped to one another. Specifically, in the illustrated embodiment, the coupling aperture 82*a* and the coupling portion 106*a* are oblong-shaped. In other embodiments, the coupling aperture 82*a* and the coupling portion 106*a* may have other shapes. By assembling the anvil 82 and the crankshaft 106 together with two steps, the crankshaft 106 (e.g., a main body of the crankshaft 106) is not required to have a diameter that is equal to the outer diameter of the lugs 86, 90 of the anvil 82 or the outer diameter of the eccentric member 110 in order for the crankshaft 106 to be supported by the bearings 182. That is, the bearings 182 are not required to have the same diameter as the outer diameter of the lugs 86, 90 of the anvil 82 or the eccentric member 110 because the crankshaft 106 is able to be inserted through the bearings 182 prior to coupling with the anvil 82. Accordingly, the two-step assembly process of the anvil 82 and the crankshaft 106 permits a more compact design of the crankshaft 106.

Figure 10:
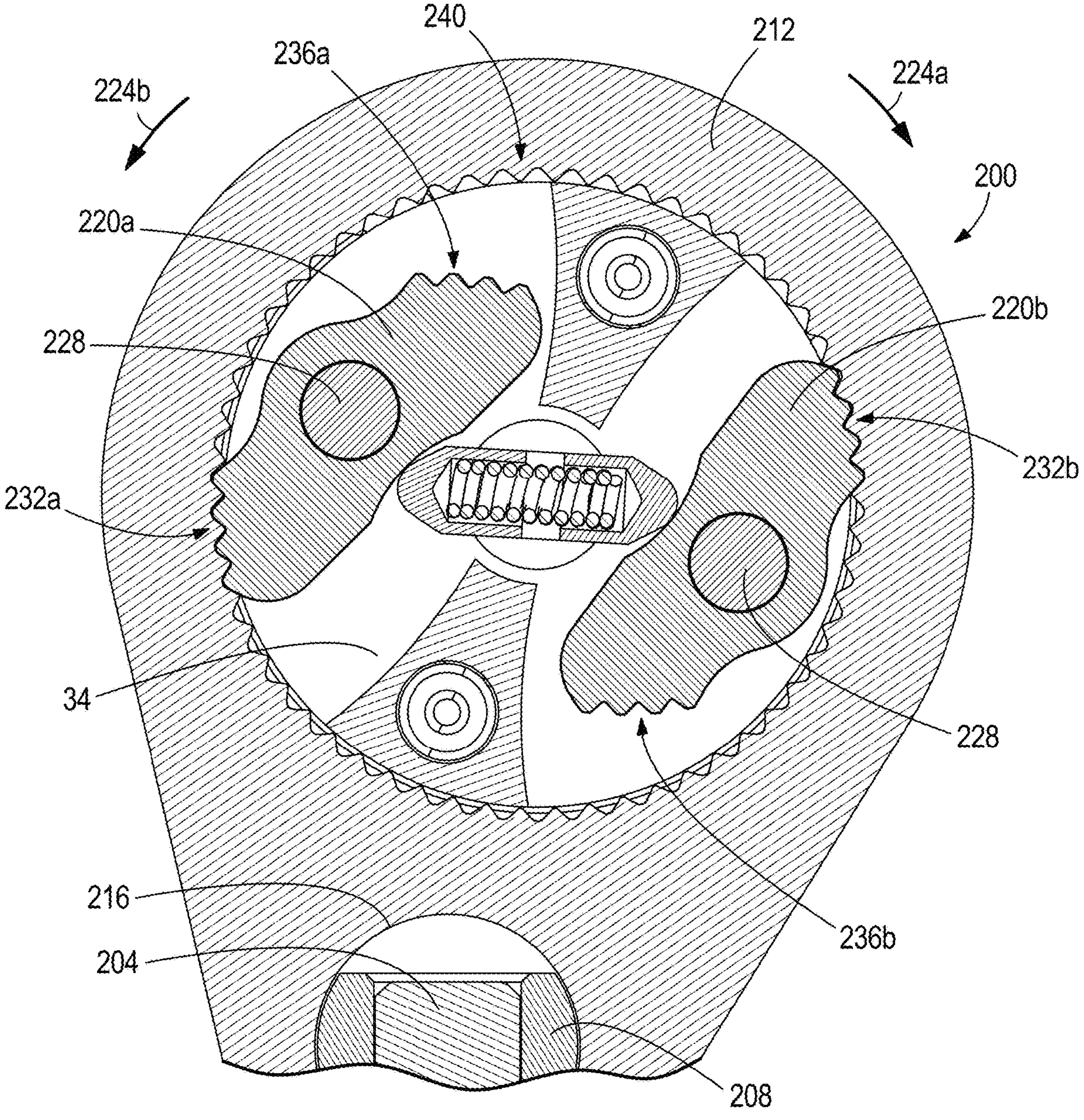
FIG. 10 is a cross-sectional view of a ratchet mechanism of an impact tool according to another embodiment.

With reference to FIG. 10, an alternative ratchet mechanism 200 that may be incorporated into the yoke housing 18 is illustrated. The illustrated ratchet mechanism 200 includes an eccentric member 204 of a crankshaft arranged within a drive bushing 208 and a yoke 212 through which the output drive 34 extends. The yoke 212 has a recess 216 in which the drive bushing 208 is arranged. The ratchet mechanism 200 further includes a first pawl 220*a* and a second pawl 220*b* provided within the yoke 212. The first and second pawls 220*a*, 220*b* are pivotably secured by a respective pin 228 that is coupled to a rotational member (not shown). The rotational member is configured to be rotated to move the first and second pawls 220*a*, 220*b* between a first position corresponding to a first rotational locking direction 224*a* of the output drive 34 and a second position corresponding to a second rotational locking direction 224*b* of the output drive 34. Each pawl 220*a*, 220*b* includes an angled first end 232*a*, 232*b* having teeth and an angled second end 236*a*, 236*b* having teeth. The first end 232*a*, 232*b* and second end 236*a*, 236*b* of each pawl 220*a*, 220*b* are configured to engage inner teeth 240 of the yoke 212.

When the rotational member is rotated to arrange the pawls 220*a*, 220*b* in the first position, the first end 232*a*, 232*b* of each pawl 220*a*, 220*b* meshes with the inner teeth 240 of the yoke 212. The first position thereby prevents the output drive 34 from rotating in the first rotational locking direction 224*a*. Once the rotational member is rotated to arrange the pawls 220*a*, 220*b* in the second position, the second end 236*a*, 236*b* of each pawl 220*a*, 220*b* meshes with the inner teeth 240 of the yoke 212. The second position thereby prevents the output drive 34 from rotating in the second rotational locking direction 224*b*. Providing two pawls within the yoke 212 reduces the amount of stress that may be experienced by a single pawl and may permit a relatively higher torque output.

Figure 11:
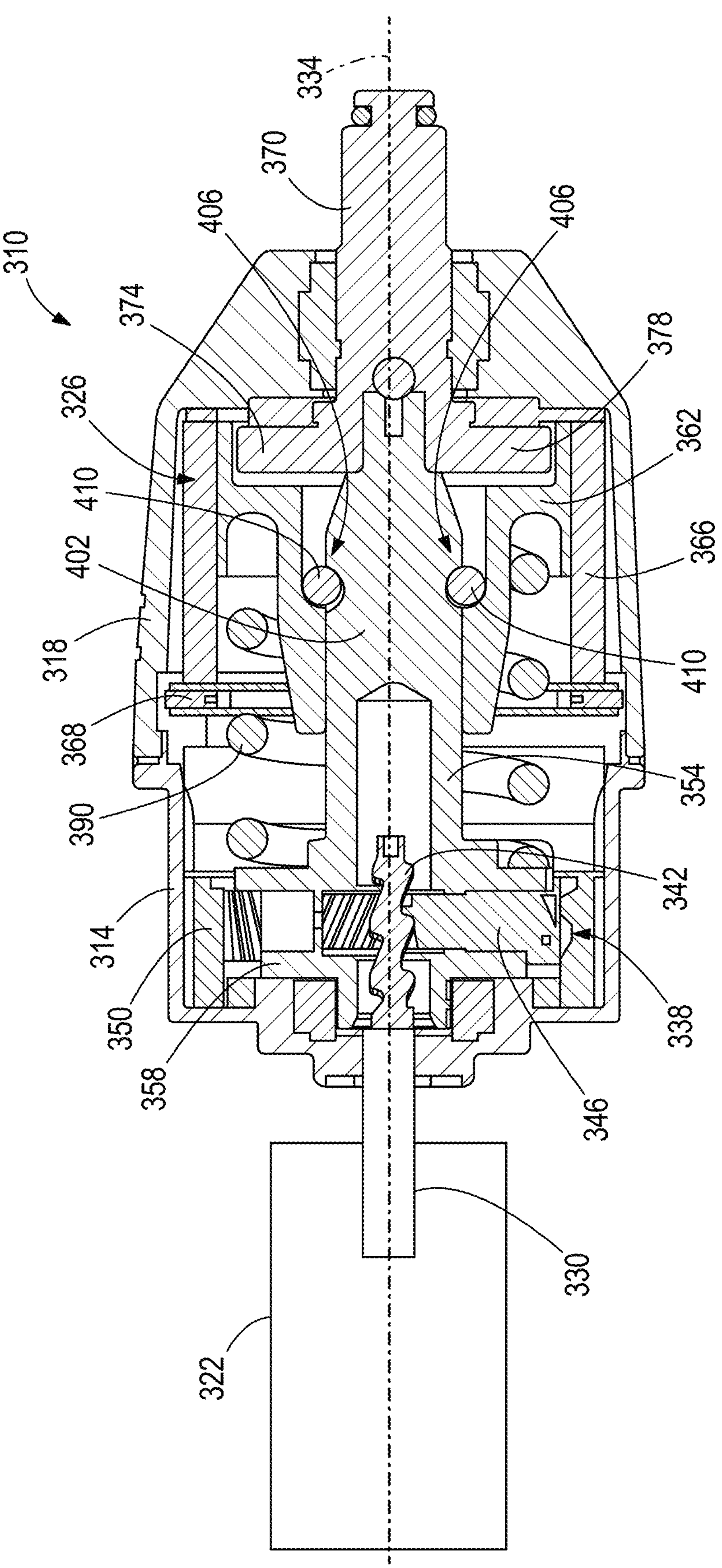
FIG. 11 is a cross-sectional view of a portion of an impact tool including an impact mechanism according to another embodiment.
Figure 12:
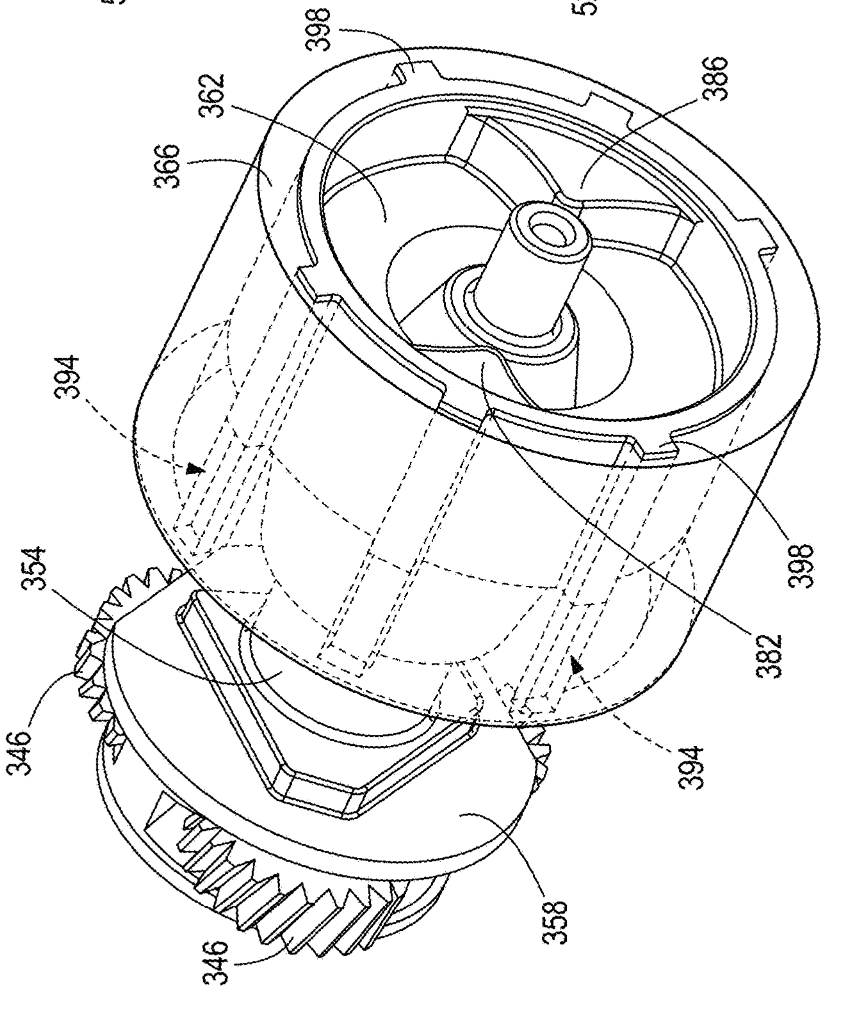
FIG. 12 is a perspective view of a portion of the impact mechanism of FIG. 11.

FIGS. 11 and 12 illustrate a portion of an impact tool 310 according to another embodiment of the disclosure. The impact tool 310 may be, for example, a rotary impact wrench, a high-torque impact wrench, or another similar wrench. The impact tool 310 includes a rear gear case 314, a front gear case 318, a motor 322, and an impact mechanism 326. The motor 322 includes an output shaft 330 that extends through the rear gear case 314 and is engaged with the impact mechanism 326 at an end of the output shaft 330 opposite from the motor 322. The motor 322 is configured to drive rotation of the output shaft 330 about an axis 334. As such, the motor 322 is configured to drive operation of the impact mechanism 326 via the output shaft 330. The impact mechanism 326 is supported within the rear gear case 314 and the front gear case 318.

The impact mechanism 326 includes a gear assembly in the form of a planetary gearset 338 operably coupled to the motor 322 to provide a speed reduction/torque increase from the motor 322. The planetary gearset 338 includes a pinion 342 coupled for co-rotation with the output shaft 330 of the motor 322, a plurality of planet gears 346 meshed with the pinion 342, and a ring gear 350 meshed with the planet gears 346. The ring gear 350 of the planetary gearset 338 is rotationally fixed within the rear gear case 314.

The impact mechanism 326 further includes a camshaft 354 driven by the output of the planetary gearset 338 (e.g., the camshaft 354 may define a planet carrier 358 of the planetary gearset 338), an inner hammer 362 coupled to the camshaft 354, an outer hammer 366 surrounding and radially supported by the inner hammer 362, a thrust bearing 368 that supports a rear end of outer hammer 366, and an anvil 370 having opposed, radially outward extending anvil lugs 374, 378 that receive impacts from corresponding hammer lugs 382, 386 on the inner hammer 362. The illustrated impact mechanism 326 also includes a compression spring 390 disposed within the outer hammer 366 and configured to bias the inner hammer 362 toward the anvil 370.

The outer hammer 366 and inner hammer 362 form a two-piece or double hammer assembly able to provide increased rotating mass and, therefore, increased impact energy to the anvil 370 compared to the inner hammer 362 alone. In addition, the outer diameter of the hammer assembly may be less than a single hammer having an equivalent mass, permitting the impact tool 310 to be more compact.

The outer hammer 366 is sleeved onto the inner hammer 362 (e.g., by cooperating projections, splines, pins, or any other suitable arrangement) such that the outer hammer 366 is coupled for co-rotation with the inner hammer 362, but the inner hammer 362 is able to move axially relative to the outer hammer 366. In particular, the illustrated outer hammer 366 is provided with keyways 394 configured to receive key portions 398 formed along the outer diameter of the inner hammer 362. In the illustrated embodiment, the key portions 398 extend outwardly from the outer surface of the inner hammer 362. In other embodiments, such as the embodiment illustrated in FIG. 7, the key portions 398 may extend inwardly from an inner surface of the outer hammer 366. The inner hammer 362 functions similar to a hammer of a conventional impact mechanism, however the inner hammer 362 is provided with a reduced outer diameter to thereby reduce a size of the impact tool 310. As such, a mass of the inner hammer 362 is also reduced. Rotatably coupling the outer hammer 366 to the inner hammer 362 adds a substantial amount of mass to the inner hammer 362.

The camshaft 354 includes a body 402 integrally formed with the planet carrier 358 of the planetary gearset 338. The camshaft 354 further includes a cam groove 406 defined along the body 402. Unlike conventional impact mechanism camshafts, which include a cam groove shaped has a double helix, thereby permitting operation of the impact mechanism in either rotational direction of the camshaft, the illustrated cam groove 406 forms a single helix about the body 402 of the camshaft 354. The geometry of the cam groove 406 causes the impact mechanism 326 to produce rotational impacts in only one rotational direction of the camshaft 354. The impact mechanism 326 is disabled in the opposite rotational direction. Cam balls 410 are received within the cam groove 406 and couple the inner hammer 362 to the camshaft 354.

Figure 13:
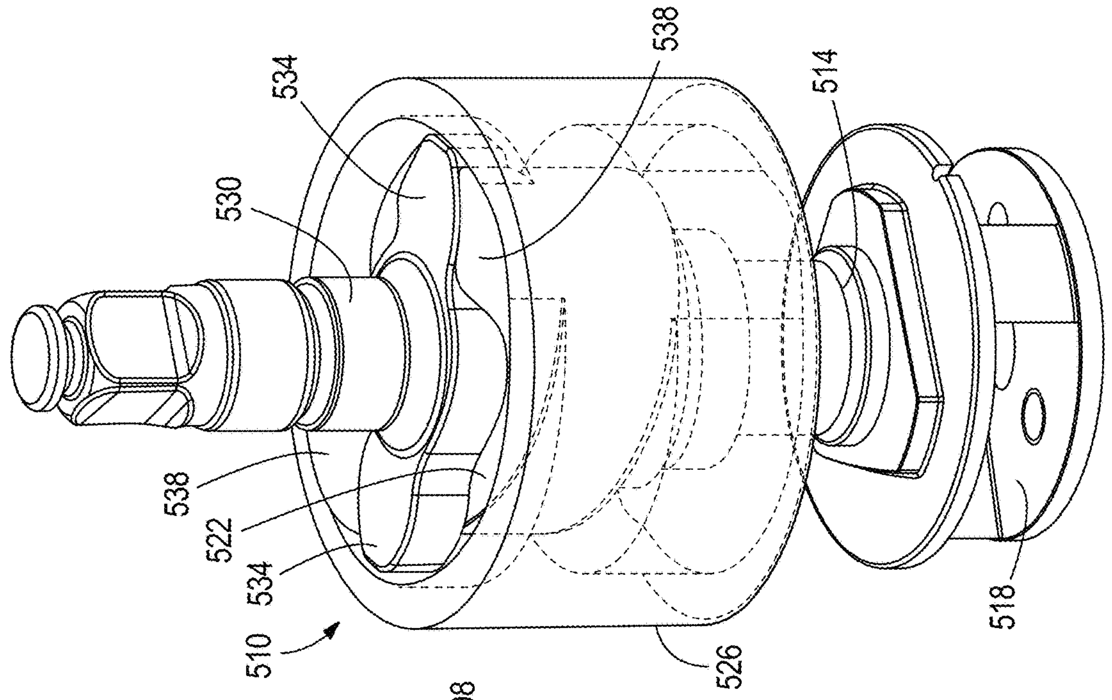
FIG. 13 is a perspective view of an impact mechanism for an impact tool according to another embodiment.

FIG. 13 illustrate a portion of an impact tool according to another embodiment of the disclosure. The impact tool may be, for example, a rotary impact wrench, a high-torque impact wrench, or another similar wrench. The portion illustrated in FIG. 13 is an impact mechanism 510 for the impact tool.

The impact mechanism 510 includes a camshaft 514 that may support a planetary gearset configured to be engaged by the motor (e.g., the camshaft 514 may define a planet carrier 518 for the planetary gearset), an inner hammer 522 coupled to the camshaft 514, an outer hammer 526 surrounding and radially supported by the inner hammer 522, and an anvil 530 having opposed, radially outward extending anvil lugs 534 that receive impacts from corresponding hammer lugs 538 on the inner hammer 522. The illustrated impact mechanism 510 may also include a compression spring that is configured to bias the inner hammer 522 toward the anvil 530.

Figure 14A:
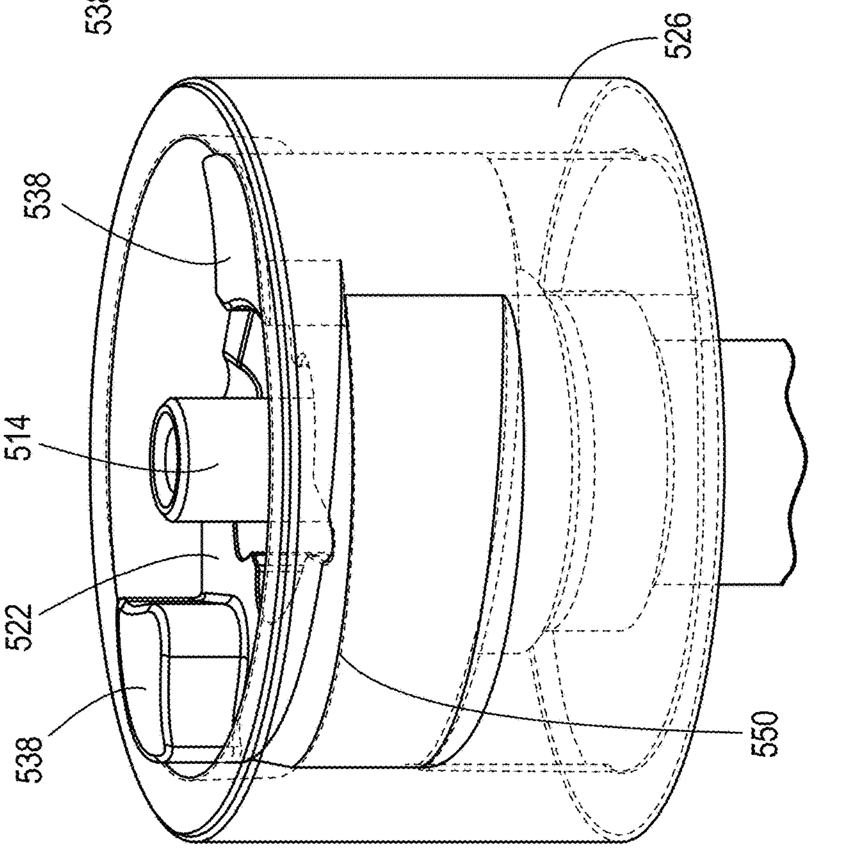
FIG. 14A is a perspective view of a portion of the impact mechanism of FIG. 13 in a first orientation.
Figure 14B:
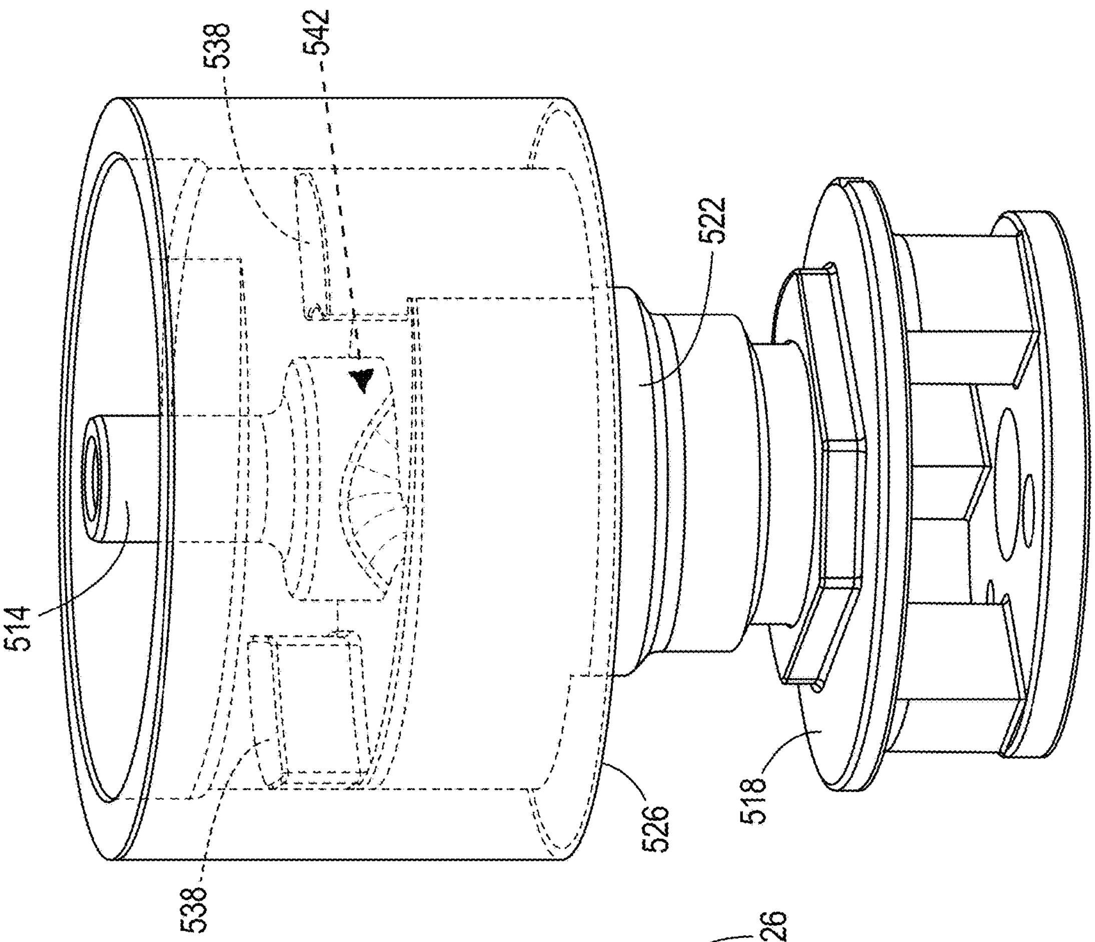
FIG. 14B is a perspective view of a portion of the impact mechanism of FIG. 13 in a second orientation.

With reference to FIGS. 14A and 14B, the camshaft 514 includes a body integrally formed with the planet carrier 518 and a cam groove 542 defined along the body. In the illustrated embodiment, the cam groove 542 forms a double helix about the body of the camshaft 514 which allows the impact mechanism 510 to produce rotational impacts in multiple (e.g., two) rotational directions. Alternatively, the cam groove 542 may form a single helix about the body of the camshaft 514 which causes the impact mechanism 510 to produce rotational impacts in just a single rotational direction. Cam balls may be received within the cam groove 542 and couple the inner hammer 522 to the camshaft 514. The cam balls enable the inner hammer 522 to translate along camshaft 514 toward and away from the anvil 530. For example, the inner hammer 522 may move between a forward-most position, as illustrated in FIG. 14A, in which the inner hammer 522 is positioned to strike the anvil 530 (FIG. 13) and a rearward-most position, as illustrated in FIG. 14B, in which the inner hammer 522 is spaced away from the anvil 530 (FIG. 13).

The outer hammer 526 and inner hammer 522 form a two-piece or double hammer assembly able to provide increased rotating mass and, therefore, increased impact energy to the anvil 530 compared to the inner hammer 522 alone. In addition, the outer diameter of the hammer assembly may be less than a single hammer having an equivalent mass, permitting the impact tool to be more compact.

Figure 15A:
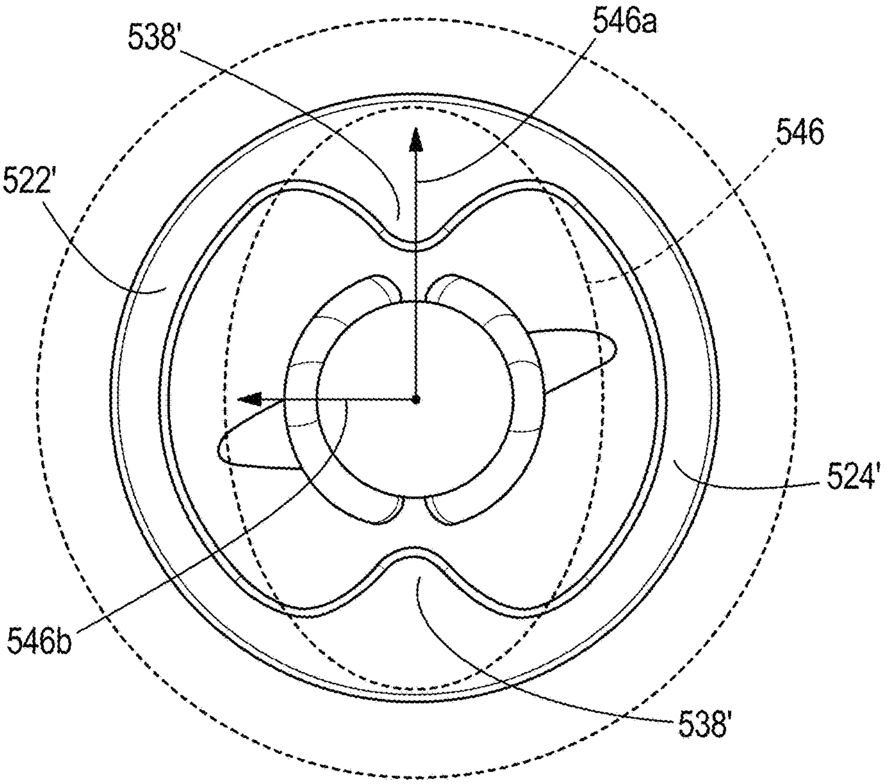
FIG. 15A is a schematic illustration of an ellipse imposed over a conventional hammer for the impact mechanism of FIG. 13.
Figure 15B:
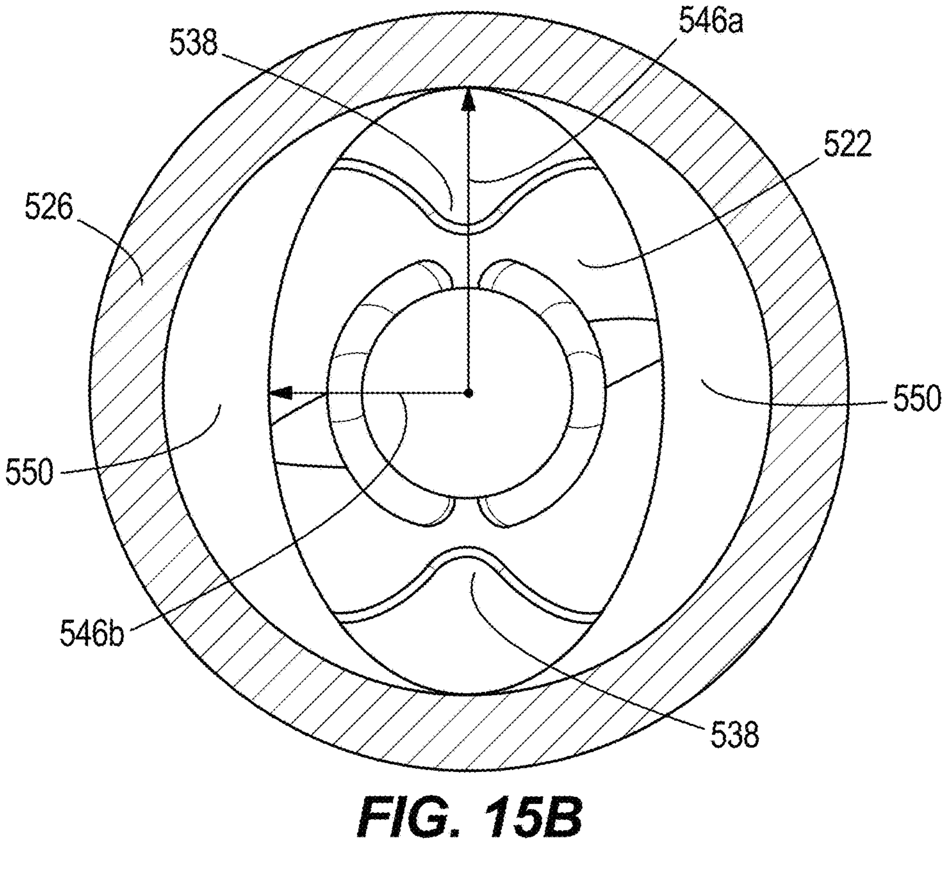
FIG. 15B is a front view of a double hammer assembly for the impact mechanism of FIG. 13.

With reference to FIGS. 15A and 15B, the inner hammer 522 may be substantially similar to the inner hammer 362 of FIG. 12, except for the differences described herein. In the illustrated embodiment of FIGS. 14A-15B, the size of the inner hammer 522 is reduced relative to the inner hammer 362 of FIG. 12. FIG. 15A illustrates a conventional hammer 522' with a schematic ellipse 546 imposed over the conventional hammer 522'. The inner hammer 522 of the illustrated embodiment, as illustrated in FIG. 15B, is formed based on what falls within the ellipse 546, as illustrated in FIG. 15A. Specifically, the inner hammer 522 is formed in the shape of the ellipse in which major radii 546*a* of the ellipse extend diametrically between the two hammer lugs 538 and minor radii 546*b* of the ellipse extend perpendicularly to the major radii 546*a*. The inner hammer 522 is formed without portions of a conventional hammer that would fall outside of the ellipse 546 (e.g., a portion of a rim 524' for the conventional hammer 522' that connects the lugs 538' in the conventional hammer 522'). In the illustrated embodiment, the major radius 546*a* is 29 mm, and the minor radius 546*b* is 19 mm such that a ratio of the major radius 546*a* to the minor radius 546*b* is roughly 1.52. In some embodiments, the major radius 546*a* and the minor radius 546*b* may have different lengths while maintaining the ratio of 1.52. In other embodiments, the major radius 546*a* and the minor radius 546*b* may be variably different such that the ratio of 1.52 is not maintained. The elliptical shape of the inner hammer 522 reduces the overall mass and size of the translating inner hammer 522 compared to the inner hammer 362 of FIG. 12. By reducing the mass and size of the translating hammer 522, vibrations translated to the user as a result of operation of the impact tool are reduced.

With continued reference to FIGS. 15A and 15B, the outer hammer 526 is sleeved onto the inner hammer 522 such that the outer hammer 526 is coupled for co-rotation with the inner hammer 522, but the inner hammer 522 is able to move axially relative to the outer hammer 526. In particular, the illustrated outer hammer 526 is provided with a hammer shoulder 550 on each side of the inner hammer 522 that protrudes from an inner surface of the outer hammer 526 toward the inner hammer 522 to effectively rotationally couple the inner hammer 522 and the outer hammer 526 together. One hammer shoulder 550 is positioned on a first side the major radius 546*a*, and another hammer shoulder 550 is positioned on a second side of the major radius 546*a* that is opposite the first side. In the illustrated embodiment, with reference to FIGS. 13 and 15B, the hammer shoulders 550 are recessed from each end of the outer hammer 526. In the illustrated embodiment, the hammer shoulders 550 are positioned relatively closer to a forward end of outer hammer 526 than to a rearward end of the outer hammer 526 to ensure rotational coupling is secure at the point of impact between the hammer lugs 538 and the anvil lugs 534. In some embodiments, the shoulders 550 may be positioned substantially in the middle of the outer hammer 526.

Returning reference to FIGS. 15A and 15B, each of the hammer shoulders 550 is formed in the shape of the portions of the conventional hammer 522' that fall outside of the ellipse 546. As such, in the illustrated embodiment, the hammer shoulders 550 are substantially crescent-shaped. In other embodiments, the hammer shoulders 550 may have different shapes. For example, the hammer shoulders 550 may have the shape of a semi-circle in which a flat side of the semi-circle extends tangentially to an outer edge of the ellipse 546 at the minor radius 546*b*. The shape of the hammer shoulders 550 permits translational movement of the inner hammer 522 relative to the outer hammer 526 (i.e., along the camshaft 514) but inhibits relative rotational movement of the hammers 522, 526. In other words, the hammer shoulders 550 effectively rotationally couple the inner hammer 522 and the outer hammer 526 together, thereby increasing the mass with which the hammer lugs 538 may strike the anvil lugs 534.

The impact mechanism of FIGS. 13-15B advantageously reduces the mass of the translating hammer (i.e., the inner hammer 522) while substantially maintaining the mass of the double hammer assembly. This enables the double hammer assembly to maintain the amount of torque that may be applied to the anvil 530 while reducing vibrations that may be transferred, or translated, to the user due to the reduced translational mass.

Figure 16:
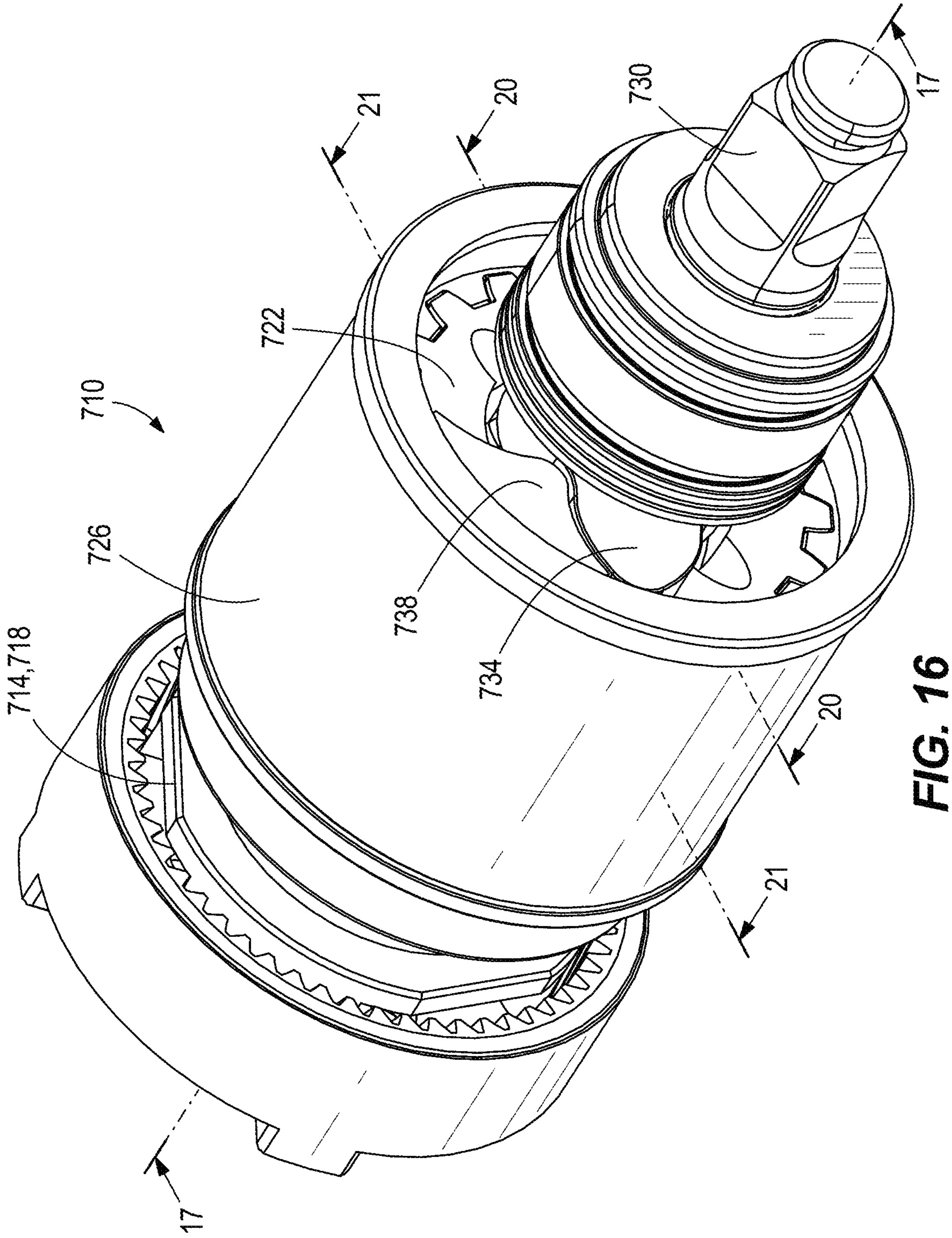
FIG. 16 is a perspective view of an impact mechanism for an impact tool according to another embodiment.
Figure 17:
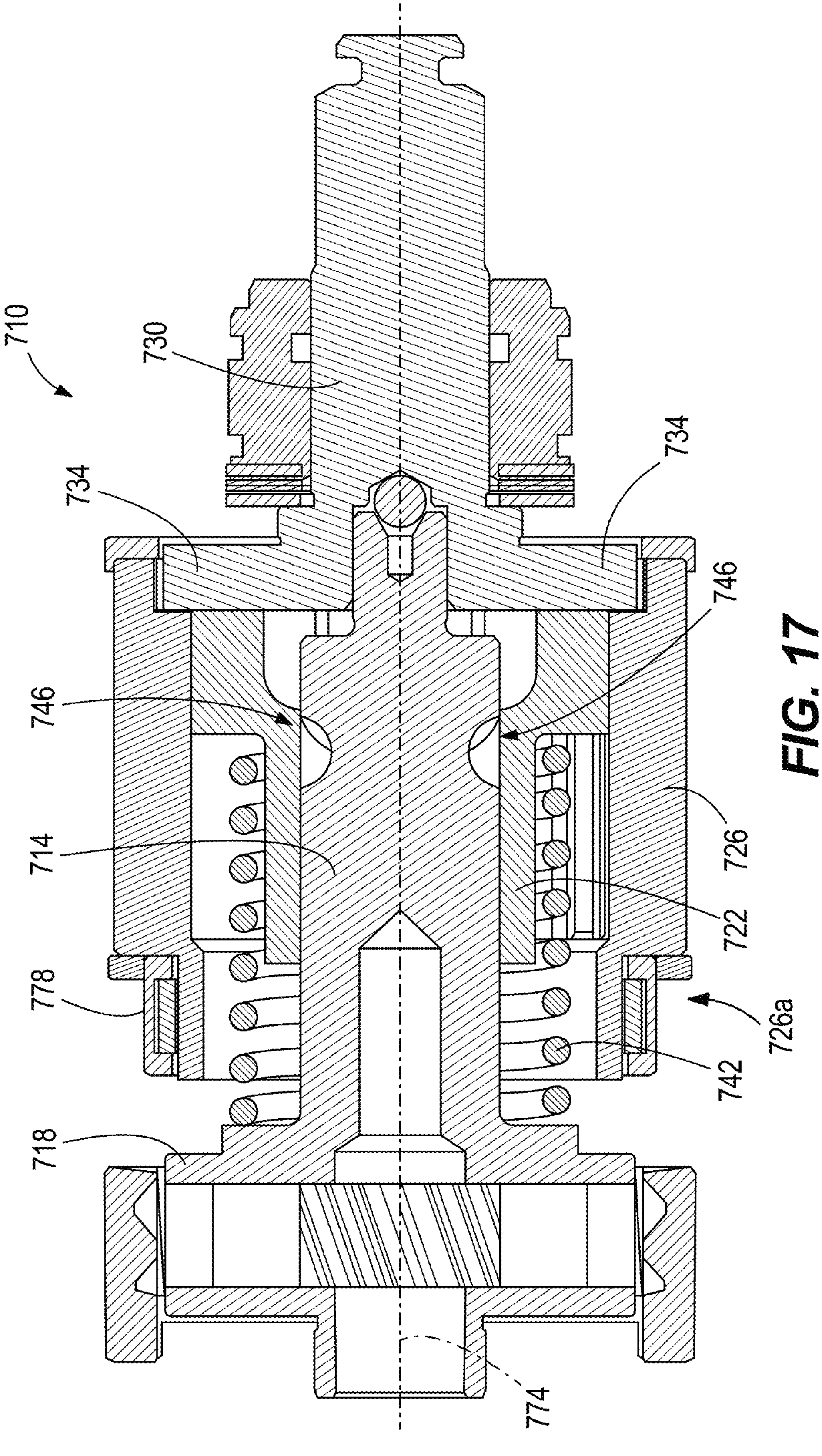
FIG. 17 is a cross-sectional view of the impact mechanism of FIG. 16 taken along line 17-17.
Figure 18:
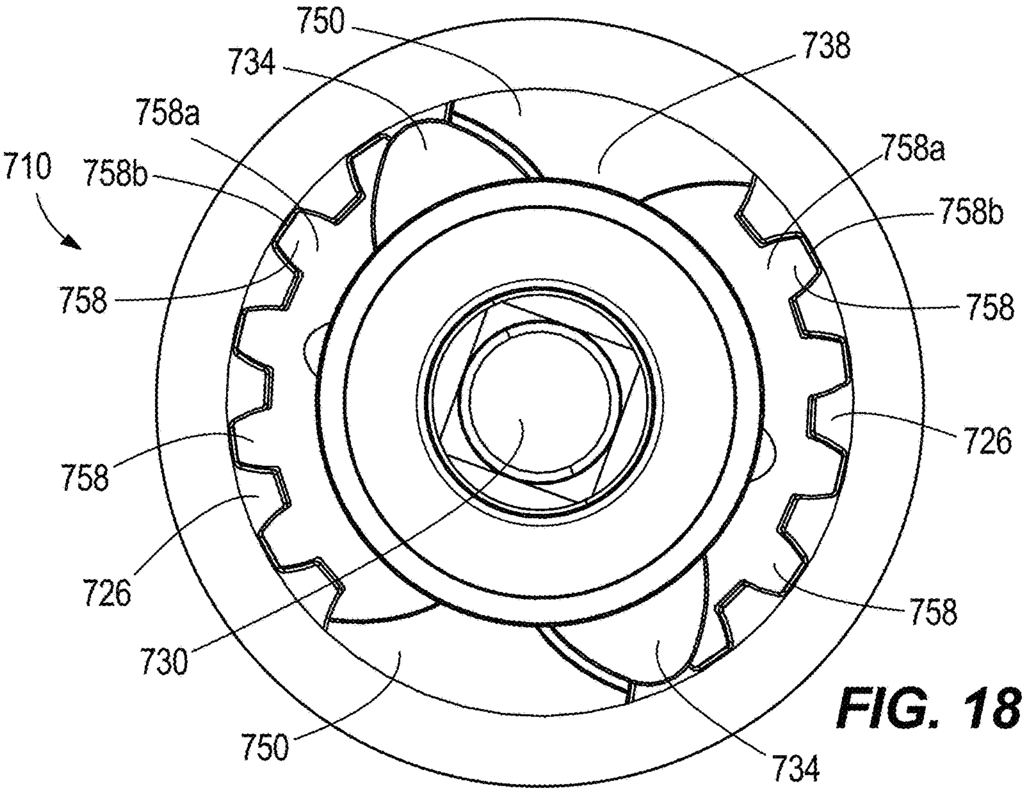
FIG. 18 is a front view of the impact mechanism of FIG. 16.

FIGS. 16-21 illustrate a portion of an impact tool according to another embodiment of the disclosure. The impact tool may be, for example, a rotary impact wrench, a high-torque impact wrench, or another similar wrench. The portion illustrated in FIGS. 16-18 is an impact mechanism 710 for the impact tool.

The impact mechanism 710 includes a camshaft 714 that may support a planetary gearset configured to be engaged by the motor (e.g., the camshaft 714 may define a planet carrier 718 for the planetary gearset), an inner hammer 722 coupled to the camshaft 714, an outer hammer 726 surrounding the inner hammer 722, and an anvil 730 having opposed, radially outward extending anvil lugs 734 that receive impacts from corresponding hammer lugs 738 on the inner hammer 722. The illustrated impact mechanism 710 also includes a compression spring 742 that is configured to bias the inner hammer 722 toward the anvil 730.

With reference to FIG. 17, the camshaft 714 includes a body integrally formed with the planet carrier 718 and a cam groove 746 defined along the body. In the illustrated embodiment, the cam groove 746 forms a double helix about the body of the camshaft 714 which allows the impact mechanism 710 to produce rotational impacts in multiple (e.g., two) rotational directions. Alternatively, the cam groove 746 may form a single helix about the body of the camshaft 714 which causes the impact mechanism 710 to produce rotational impacts in just a single rotational direction. Cam balls may be received within the cam groove 746 and couple the inner hammer 722 to the camshaft 714. The cam balls enable the inner hammer 722 to translate along the camshaft 714 toward and away from the anvil 730. For example, the inner hammer 722 may move between a forward-most position in which the inner hammer 722 is positioned to strike the anvil 730 and a rearward-most position in which the inner hammer 722 is spaced away from the anvil 730.

The outer hammer 726 and the inner hammer 722 form a two-piece or double hammer assembly able to provide increased rotating mass and, therefore, increased impact energy to the anvil 730 compared to the inner hammer 722 alone. In addition, the outer diameter of the hammer assembly may be less than a single hammer having an equivalent mass, permitting the impact tool to be more compact.

Figure 19:
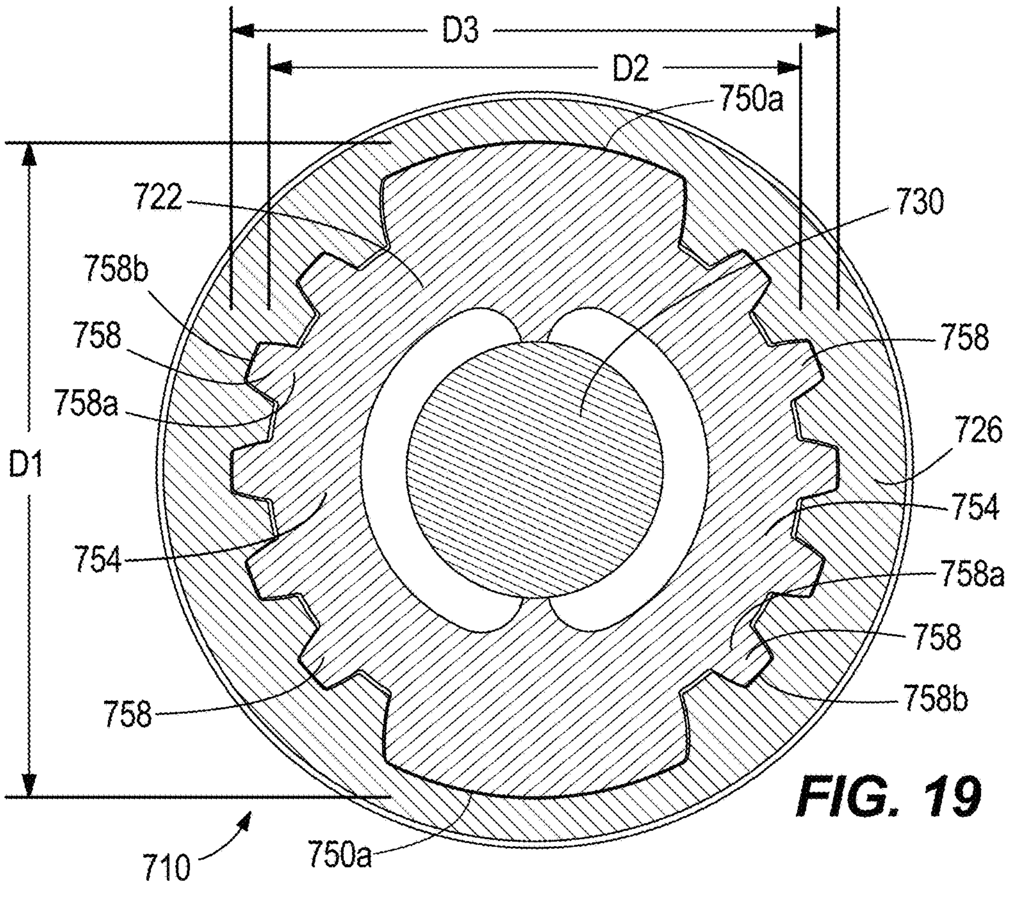
FIG. 19 is a rear view of a portion of the impact mechanism of FIG. 16.

With reference to FIGS. 17-19, the inner hammer 722 may be substantially similar to the inner hammer 362 of FIG. 12 and/or the inner hammer 522 of FIG. 15A, except for the differences described herein. In the illustrated embodiment of FIGS. 16-19, the size of the inner hammer is reduced relative to the inner hammer 362 of FIG. 12 and is increased relative to the inner hammer 522 of FIG. 15A. The inner hammer 722 includes two flanges 750 and a circular portion 754 positioned between the two flanges 750. In the illustrated embodiment, the two flanges 750 are diametrically opposed from one another (i.e., diametrically across the circular portion 754), and the flanges 750 axially protrude from the circular portion 754 (i.e., along an extension direction of the camshaft 714). Each of the of the two flanges 750 includes one of the hammer lugs 738. The hammer lugs 738 may be substantially similar (e.g., have a similar shape) to the hammer lugs 382, 386 of FIGS. 11 and 12 and the hammer lugs 538 of FIGS. 14A and 14B. A first diameter D1 of the inner hammer 722 is defined by the outer edges 750*a* of the flanges 750. The circular portion 754 includes a central aperture for mounting the inner hammer 722 to the camshaft 714 and a plurality of key portions 758 that protrude from an outer perimeter of the circular portion 754. In the illustrated embodiment, the inner hammer 722 includes 10 key portions 758. The plurality of key portions 758 is provided along the perimeter of the circular portion 754 between the flanges 750. Specifically, 5 key portions 758 are provided between the flanges 750 on the circular portion 754 on a first side of the inner hammer 722 (e.g., a right side), and 5 key portions 758 are provided between the flanges 750 on the circular portion 754 on a second side of the inner hammer 722 (e.g., a left side). A second diameter D2 and a third diameter D3 are defined by the circular portion 754. Specifically, the second diameter D2 is defined by the outer perimeter of the circular portion 754 at a base 758*a* of the key portions 758, and the third diameter D3 is defined by an outer protruding edge 758*b* of the key portions 758. As such, the third diameter D3 is larger than the second diameter D2. Both the second diameter D2 and the third diameter D3 are smaller than the first diameter D1.

Figure 20:
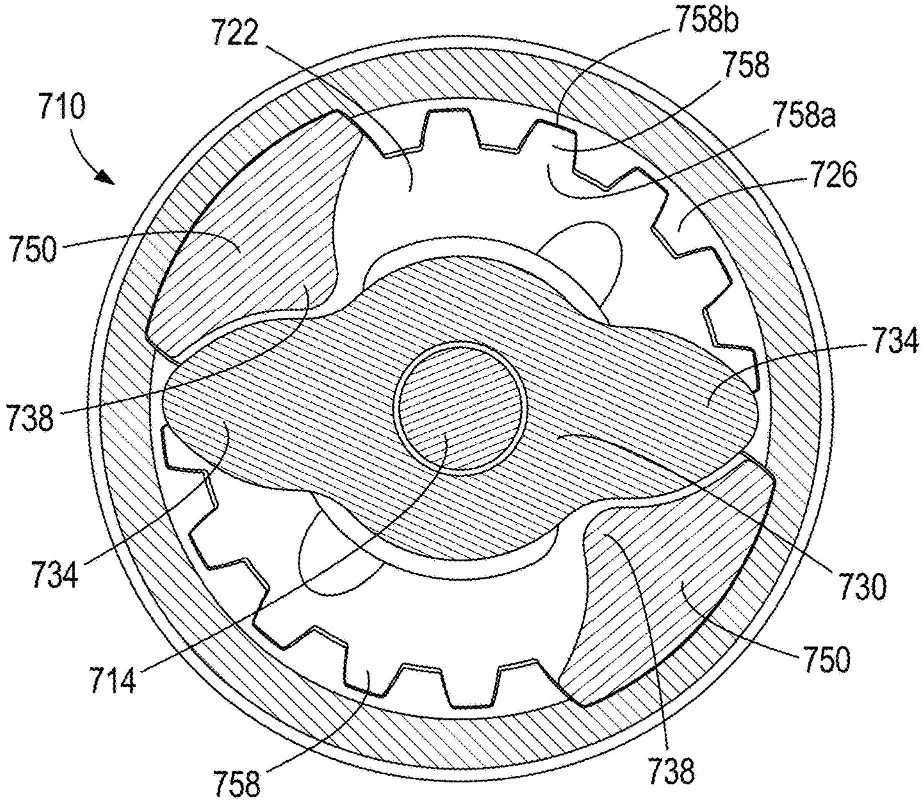
FIG. 20 is a cross-sectional view of the impact mechanism of FIG. 16 taken along line 20-20.
Figure 21:
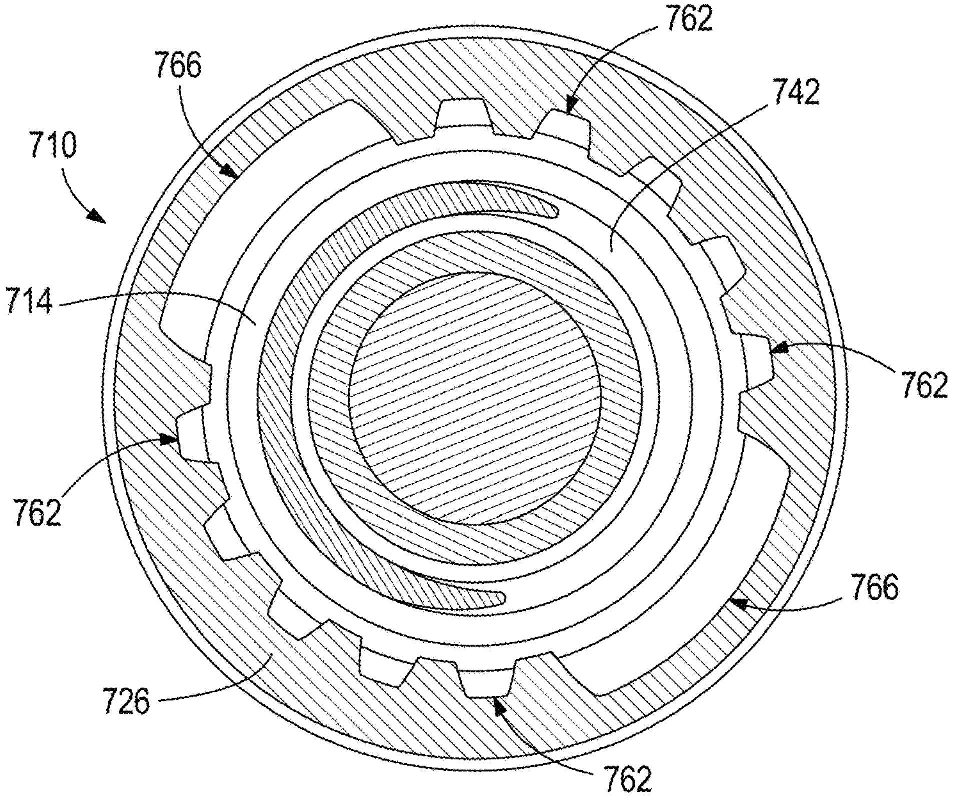
FIG. 21 is a cross-sectional view of the impact mechanism of FIG. 16 taken along line 21-21.

With reference to FIGS. 20 and 21, the outer hammer 726 is sleeved onto the inner hammer 722 such that the outer hammer 726 is coupled for co-rotation with the inner hammer 722, but the inner hammer 722 is able to move axially relative to the outer hammer 726. In particular, the illustrated outer hammer 726 is provided with keyways 762 configured to receive the key portions 758 from the circular portion 754. In other embodiments, the outer hammer 726 may have key portions that protrude inwardly from an inner circumference of the outer hammer 726 and are received in keyways formed in the inner hammer 722. The outer hammer 726 is also provided with flange receptacles 766 that are each configured to receive one of the flanges 750 from the inner hammer 722. The engagement between the key portions 758 and the keyways 762 and between the flanges 750 and the flange receptacles 766 inhibits relative rotation between the inner hammer 722 and the outer hammer 726 but permits the inner hammer 722 to slide relative to the outer hammer 726.

Figure 22:
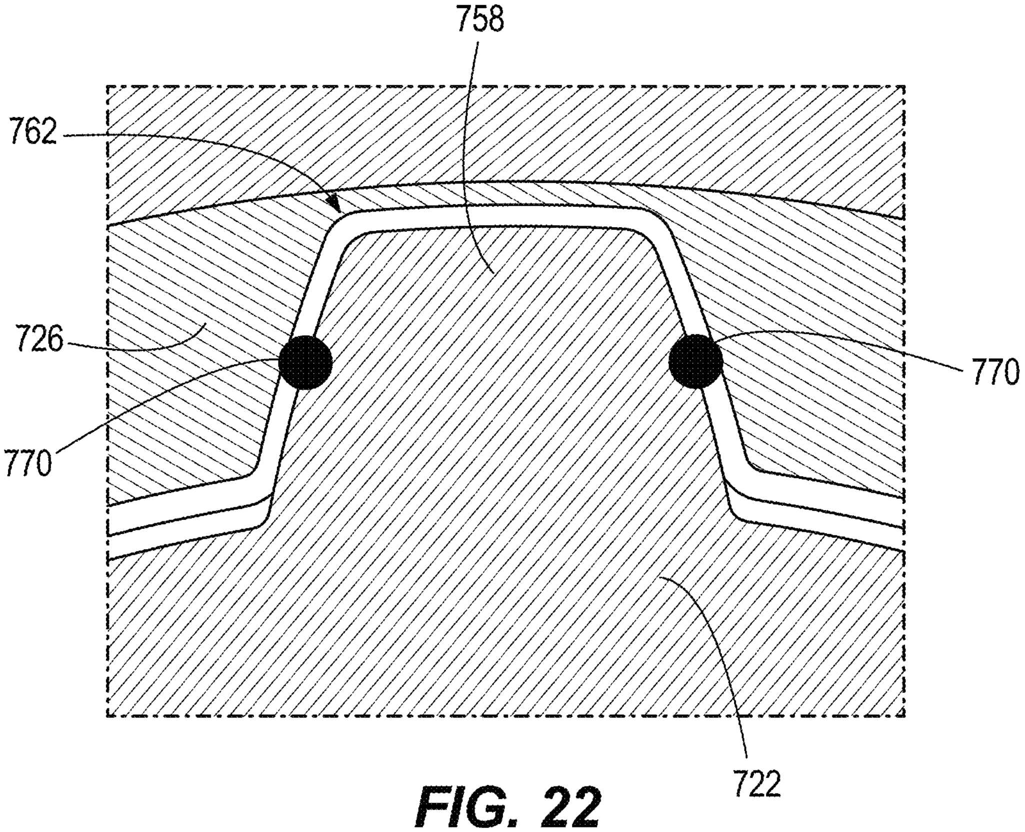
FIG. 22 is a zoomed-in view of a portion of the impact mechanism of FIG. 16.

In the illustrated embodiment, with reference to FIGS. 18 and 22, the key portions 758 and the keyways 762 have complementary involute profiles. An involute profile is the locus of a point considered as the end of a taut string being unwound from a given curve in the plane of that curve. Accordingly, clearance may exist between the key portions 758 and the keyways 762 that allows for controlled-line action sliding between the inner hammer 722 and the outer hammer 726. In controlled-line action sliding, each of the key portions 758 may have a single point of contact 770 (in a given plane) with the outer hammer 726 in the keyways 762 one each side surface of the key portions 758. As such, the key portions 758 are configured to slide along a single line of engagement with the outer hammer 726 that extends along a center axis 774 (FIG. 17) of the impact mechanism 710 (e.g., the point of contact 770 extended along the center axis 774). The clearance between the key portions 758 and the keyways 762 may enable the key portions 758 to move within the keyways 762 more smoothly and with less friction, thereby inhibiting jamming between the inner hammer 722 and the outer hammer 726 during operation of the impact mechanism 710. Additionally, the point of contact 770 may change during operation such that the line of engagement between the inner hammer 722 and the outer hammer 726, as the inner hammer 722 slides, is curved. Conventional double hammer mechanisms without keys and keyways having involute profiles may undergo planar sliding and/or wedging between the inner hammer and the outer hammer in which planar surfaces of the keys interface with corresponding planar surfaces of the keyways. Due to the edges between adjacent planar surfaces, conventional double hammer mechanisms may be more susceptible to jamming. Therefore, the double hammer mechanism of the illustrated embodiment allows for more efficient and more predictable sliding between the inner hammer 722 and the outer hammer 726.

With reference to FIGS. 17 and 21, due to the clearance between the key portions 758 and the keyways 762, the inner hammer 722 does not provide constant radial support for the outer hammer 726. As such, the impact mechanism 710 further includes a needle bearing 778 that is mounted to a rear portion 726*a* of the outer hammer 726. The needle bearing 778 may be engaged with the housing of the power tool to radially support the outer hammer 726.

The impact mechanism 710 of FIGS. 16-21 advantageously reduces the mass of the translating hammer (i.e., the inner hammer 722) while maintaining the mass of the double hammer assembly and maintaining alignment between the inner hammer 722 and the outer hammer 726. This enables the double hammer assembly to maintain the amount of torque that may be applied to the anvil while reducing vibrations that may be transferred, or translated to the user due to the reduced translational mass and while maintaining alignment between the inner hammer 722 and the outer hammer 726 even under heavy loads and impacts.

Although the disclosure has been described in detail with reference to certain preferred embodiments, variations and modifications exist within the scope and spirit of one or more independent aspects of the disclosure as described.

Various features and aspects of the present disclosure are set forth in the following claims.

What is claimed is:

1. An impact tool comprising:
- a housing;
- a motor disposed within the housing, the motor including an output shaft rotatable about a first axis;
- an impact mechanism including
  - a camshaft driven by the motor to rotate about the first axis,
  - an anvil, and
  - a hammer configured to reciprocate along the camshaft to impart rotational impacts to the anvil in response to rotation of the camshaft in a first direction about the first axis in a first operating mode of the impact tool and to directly drive the anvil in response to rotation of the camshaft in a second direction about the first axis opposite the first direction in a second operating mode of the impact tool;
- a crankshaft coupled to the anvil for co-rotation with the anvil;
- a yoke driven by the crankshaft to reciprocate about a second axis perpendicular to the first axis in response to rotation of the crankshaft;
- an output drive configured to receive a tool element; and
- a pawl configured to selectively couple the output drive to the yoke for co-rotation with the yoke in a first rotational locking direction about the second axis and to permit the yoke to rotate relative to the pawl in a second rotational locking direction about the second axis opposite the first rotational locking direction.

2. The impact tool of claim 1, wherein the hammer is a first hammer, and wherein the impact mechanism further includes a second hammer coupled for co-rotation with the first hammer.

3. The impact tool of claim 2, wherein the first hammer is an inner hammer, and wherein the second hammer is an outer hammer surrounding the inner hammer.

4. The impact tool of claim 3, wherein the camshaft includes a body and a cam groove defined along the body, the cam groove configured to receive cam balls, and thereby couple the inner hammer to the camshaft.

5. The impact tool of claim 4, wherein in the first operating mode, the cam balls engages a rear end of the cam groove to permit the inner hammer to impart rotational impacts to the anvil, and wherein in the second operating mode, the cam balls engage a front end of the cam groove such that the inner hammer and the outer hammer co-rotate with the camshaft.

6. The impact tool of claim 1, further comprising a mode actuator configured to toggle the impact tool between the first operating mode and the second operating mode.

7. An impact mechanism for an impact tool, the impact mechanism comprising:
- a camshaft configured to rotate about an axis in response to receiving a motor output;
- an anvil including anvil lugs;
- a first hammer mounted to the camshaft and including hammer lugs that are configured to rotationally impact the anvil lugs; and
- a second hammer sleeved onto the first hammer;
- wherein one of the first hammer and the second hammer includes a plurality of key portions and the other of the first hammer and the second hammer includes a plurality of keyways, each of the key portions configured to slide along a corresponding one of the keyways to allow for relative axial movement between the first hammer and the second hammer.

8. The impact mechanism of claim 7, wherein each of the key portions is a projection extending inwardly from an inner surface of the second hammer.

9. The impact mechanism of claim 7, wherein each of the key portions is a projection extending outwardly from an outer surface of the first hammer.

10. The impact mechanism of claim 7, further comprising a hammer spring that biases the first hammer toward the anvil, and wherein the hammer spring extends at least partially through the second hammer.

11. The impact mechanism of claim 10, wherein a rear end of the hammer spring is supported against a portion of the second hammer.

12. The impact mechanism of claim 10, wherein a rear end of the hammer spring is supported against the camshaft.

13. The impact mechanism of claim 7, further comprising a thrust bearing supporting a rear end of the second hammer.

14. The impact mechanism of claim 7, wherein the first hammer is configured to reciprocate along the camshaft to impart rotational impacts to the anvil in response to rotation of the camshaft in a first direction about a first axis in a first operating mode of the impact tool and to directly drive the anvil in response to rotation of the camshaft in a second direction about the axis opposite the first direction in a second operating mode of the impact tool.

15. The impact mechanism of claim 7, wherein the axis is a first axis, and wherein the impact mechanism comprises a crankshaft coupled to the anvil for co-rotation with the anvil, and a yoke driven by the crankshaft to reciprocate about a second axis perpendicular to the first axis in response to rotation of the crankshaft.

16. An impact mechanism for an impact tool, the impact mechanism comprising:
- a camshaft configured to rotate about an axis in response to receiving a motor output;
- an anvil including anvil lugs;
- a first hammer mounted to the camshaft and including hammer lugs that are configured to rotationally impact the anvil lugs; and
- a second hammer sleeved on the first hammer;
- wherein one of the first hammer and the second hammer includes a protrusion that extends from the one of the first hammer and the second hammer toward the other of the first hammer and the second hammer to rotationally couple the first hammer and the second hammer together.

17. The impact mechanism of claim 16, wherein the first hammer is translatable along the camshaft relative to the second hammer.

18. The impact mechanism of claim 16, wherein the first hammer is formed in the shape of an ellipse having major radii, wherein the first hammer includes two hammer lugs, and wherein each of the hammer lugs is positioned at an end of a corresponding one of the major radii.

19. The impact mechanism of claim 18, wherein the ellipse has minor radii extending perpendicular to the major radii, and wherein a ratio of a major radius of the ellipse to a minor radius of the ellipse is about 1.52.

20. The impact mechanism of claim 19, wherein the major radius is 29 mm and the minor radius is 19 mm.

* * * * *